United States Patent
Kong et al.

(10) Patent No.: US 8,049,956 B2
(45) Date of Patent: Nov. 1, 2011

(54) APPARATUS FOR SPECTRUM-DOUBLED OPTICAL PARAMETRIC CHIRPED PULSE AMPLIFICATION (OPCPA) USING THIRD-ORDER DISPERSION CHIRPING

(75) Inventors: Hong Jin Kong, Daejeon (KR); Dong Won Lee, Daejeon (KR); Young Ho Park, Seoul (KR); Jin Woo Yoon, Pusan (KR); Mi Jung Cho, Daejeon (KR); Jae Sung Shin, Daejeon (KR); Byoung Goo Jeon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 532 days.

(21) Appl. No.: 12/307,576

(22) PCT Filed: Jan. 29, 2007

(86) PCT No.: PCT/KR2007/000492
§ 371 (c)(1),
(2), (4) Date: Jan. 5, 2009

(87) PCT Pub. No.: WO2008/004738
PCT Pub. Date: Jan. 10, 2008

(65) Prior Publication Data
US 2009/0251769 A1 Oct. 8, 2009

(30) Foreign Application Priority Data
Jul. 5, 2006 (KR) .......................... 10-2006-0063090

(51) Int. Cl.
*H01S 3/00* (2006.01)
(52) U.S. Cl. ...................... 359/337.5; 359/330; 359/333
(58) Field of Classification Search .................. 359/330, 359/333, 337.5
See application file for complete search history.

(56) References Cited

U.S. PATENT DOCUMENTS

| 6,208,458 | B1 * | 3/2001 | Galvanauskas et al. ...... 359/345 |
| 6,775,053 | B2 | 8/2004 | Jovanovic et al. |
| 2005/0105865 | A1 | 5/2005 | Fermann et al. |
| 2006/0120418 | A1 | 6/2006 | Harter et al. |

* cited by examiner

*Primary Examiner* — Mark Hellner
(74) *Attorney, Agent, or Firm* — Mayer & Williams PC

(57) ABSTRACT

The present invention relates to an OPCPA apparatus. The OPCPA of the present invention includes an optical pulse stretcher (100) for outputting chirped laser light using odd-order dispersion (third-order dispersion is mainly used). A pump laser (200) outputs pump laser light. An OPA unit (300) receives the pump laser light and the chirped laser light (signal), amplifies the signal using the pump laser light, and generates an idler. An optical signal separation unit (400) separates output light of the OPA unit into the signal, the idler, and remaining light (pump). An optical pulse compressor (600) compensates for pulse chirping caused by odd-order dispersion that is imparted by the optical pulse stretcher, thus temporally compressing the signal and the idler, which overlap each other.

24 Claims, 22 Drawing Sheets

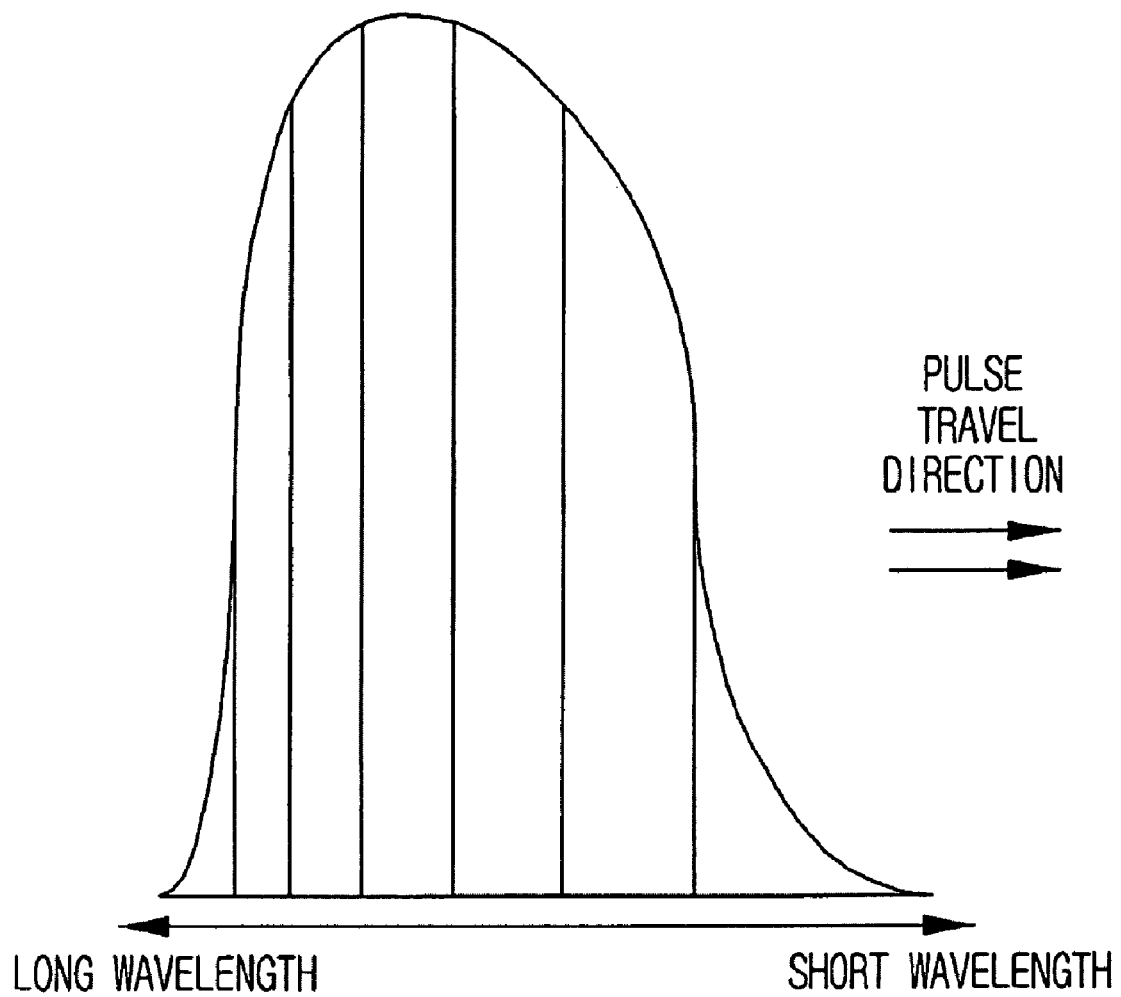

_US 8,049,956 B2_

APPARATUS FOR SPECTRUM-DOUBLED OPTICAL PARAMETRIC CHIRPED PULSE AMPLIFICATION (OPCPA) USING THIRD-ORDER DISPERSION CHIRPING

TECHNICAL FIELD

The present invention relates, in general, to an Optical Parametric Chirped Pulse Amplification (OPCPA) apparatus and, more particularly, to an OPCPA apparatus, which doubles a wavelength bandwidth as well as an energy amplification factor, thus not only compensating for spectrum loss, but also obtaining laser light having a temporal pulse width shorter than that of an original signal.

BACKGROUND ART

Generally, Optical Parametric Chirped Pulse Amplification (OPCPA) is used to amplify an ultrashort mode-locked laser source existing in a band ranging from several femtoseconds (fs; $10^{-15}$ seconds) to several hundreds of femtoseconds. OPCPA is a new optical amplification technique of combining conventional Chirped Pulse Amplification (CPA) technology with the concept of Optical Parametric Amplification (OPA), and is laser amplification technology which has recently been actively researched.

In a conventional OPCPA apparatus, an antiparallel diffraction grating structure of applying long-wavelength preceding-type chirping (positive chirping by the antiparallelism of a grating pair) is first applied to an optical pulse stretcher, and a parallel diffraction grating structure of applying short-wavelength preceding-type chirping after amplification has been performed (negative chirping by the parallelism of a grating pair) is applied to an optical pulse compressor, so that the temporal stretch of a pulse occurring in the optical pulse stretcher is compensated for.

Such an OPCPA apparatus is described in detail with reference to FIGS. 1 to 4.

FIG. 1a is a simple diagram of a conventional OPCPA apparatus, and FIG. 1b is a detailed diagram showing the construction of the OPCPA apparatus of FIG. 1a.

Referring to FIGS. 1a and 1b, the conventional OPCPA apparatus includes an optical pulse stretcher 10, a pump-injection dichroic mirror 80, a pump laser 20, an Optical Parametric Amplification (OPA) unit 30, a pump-removal dichroic mirror 40, a beam dumper 50, and an optical pulse compressor 60.

The optical pulse stretcher 10 temporally stretches laser light by varying the optical path of the laser light for each frequency. That is, the optical pulse stretcher 10 stretches the pulse length (pulse duration) of the output light of an ultrashort laser from an original band of several femtoseconds (fs; $10^{-15}$ seconds)/several tens of picoseconds (ps; $10^{-12}$ seconds) to a stretch band of several hundreds of picoseconds (ps; $10^{-12}$ seconds)/several nanoseconds (ns; $10^{-9}$ seconds) (in relation to this technology, refer to relevant CPA technology devised to realize efficient optical amplification and to avoid damage to optical parts).

The optical pulse stretcher used in this case and provided in the previous stage of the amplification stage applies dispersion according to wavelength, and stretches the temporal length of a pulse (temporal pulse duration) as a result of the spatial dispersion (optical path length difference), which is referred to as pulse chirping.

In the present specification, the output light of the optical pulse stretcher 10 is briefly referred to as a 'signal'.

In the conventional OPCPA apparatus, light passes through the above optical pulse stretcher, and thus a temporally chirped signal (long wavelength precedes short wavelength) is output, as shown in FIG. 4.

The pump laser 20 is a device for supplying pump laser light (also briefly referred to as a 'pump').

The pump-injection dichroic mirror 80 is a device for receiving the pump and the signal, and transmitting the pump and the signal to a subsequent stage (OPA unit).

The OPA unit 30 amplifies the signal using the pump, and generates an idler. Accordingly, the pump itself is attenuated to a corresponding degree by energy conservation.

Then, the output light of the OPA unit includes the pump, the amplified signal and the idler.

Optical parametric amplification is classified into collinear phase matching and noncollinear phase matching according to the phase matching configuration between the pump and the signal. When a design condition is selected properly in the noncollinear phase matching configuration, a gain bandwidth broader than that of the collinear phase matching can be obtained. Accordingly, at the time of performing broadband Optical Parametric Amplification (broadband OPA), noncollinear phase matching is generally used. In this case, since it is difficult to subsequently use an idler due to angular dispersion according to wavelength, the idler is removed using a beam dumper.

The pump-removal dichroic mirror 40 separates the output light of the OPA unit 30 into a signal and remaining light (idler and pump), and varies the optical paths thereof.

For example, the pump-removal dichroic mirror 40 reflects the signal, passes the idler and the pump therethrough, and removes the passed idler and pump using the beam dumper 50.

Generally, since the output light, emitted from the ultrashort laser oscillator itself, has a very small amount of energy per pulse, the output light is amplified through several stages of amplification (OPA) means.

In this case, the amplification means includes pump lasers 21 and 22, OPA units 31 and 32, pump-removal dichroic mirrors 41 and 42, and beam dumpers 51 and 52. The amplification means is provided in a plural number, and thus a signal having a desired intensity can be obtained.

As described above, when the amplification of the signal to the desired intensity is performed, temporal compression is finally performed using the optical pulse compressor 60.

Reference numerals 71 to 74 are beam path changing mirrors for changing the paths of light (beam).

FIGS. 2a to 2d are diagrams showing the construction of the optical pulse stretcher of the conventional OPCPA apparatus, FIG. 2a illustrating an antiparallel diffraction grating structure (refraction type), FIG. 2b illustrating an antiparallel diffraction grating structure (reflection type), and FIGS. 2c and 2d illustrating the plan view and side view of an antiparallel diffraction grating structure (Offner—triplet type).

First, referring to FIG. 2a, the refraction-type diffraction grating structure includes two diffraction gratings (respectively designated as 'first diffraction grating' and 'second diffraction grating') 111 and 112, two lenses 113 and 114, and a single roof mirror 115.

The roof mirror 115 functions to reflect incident light at a changed height.

The optical path thereof is described. After light is incident on and diffracted from the first diffraction grating 111, the diffracted light passes through the two lenses 113 and 114 and is incident on and diffracted from the second diffraction grating 112. The diffracted light is incident on the roof mirror 115, and is reflected from the roof mirror 115 at a changed height.

The reflected light is incident on the beam path changing mirror 71 through the second diffraction grating 112, the two lenses 114 and 113, and the first diffraction grating 111.

In this case, a corresponding separation distance (that is, a corresponding separation distance between gratings which has same chirping power, in parallel grating structure) is represented by $2f-s_1-s_2$, where f denotes the focal distance of the lenses 113 and 114, and $s_1$ and $s_2$ denote the distances between the lens 113 and the diffraction grating 111 and between the lens 114 and the diffraction grating 112, respectively.

In the refraction-type antiparallel diffraction grating structure of FIG. 2a, the following problems may occur. That is, in the refraction-type antiparallel diffraction grating structure including the lenses 113 and 114, chromatic aberration caused by the lenses, etc. may occur.

In order to solve the problem of chromatic aberration caused by the lenses, the reflection-type antiparallel diffraction grating structure of FIG. 2b has been devised.

Referring to FIG. 2b, the reflection-type antiparallel diffraction grating structure includes two diffraction gratings (respectively designated as 'first diffraction grating' and 'second diffraction grating') 121 and 122, two cylinder mirrors 123 and 124, and a single roof prism 125.

The roof prism 125 performs the same function as the roof mirror of FIG. 2a.

The optical path thereof is described. After light is incident on and diffracted from the first diffraction grating 121, the diffracted light is incident on and diffracted from the second diffraction grating 122 through the two cylinder mirrors 123 and 124. The diffracted light is incident on the roof prism 125. The incident light is reflected from the roof prism 125 at a changed height, and the reflected light is incident on the beam path changing mirror 71 through the second diffraction grating 122, the cylinder mirrors 124 and 123, and the first diffraction grating 121.

In this case, a corresponding separation distance is represented by $2f-s_1-s_2$, where f denotes the focal distance of the cylinder mirrors 123 and 124, and $s_1$ and $s_2$ denote the distances between the cylinder mirror 123 and the diffraction grating 121, and between the cylinder mirror 124 and the diffraction grating 122.

The reflection-type antiparallel diffraction grating structure of FIG. 2b may have the following problem. Specifically, a problem of aberration (such as astigmatism and coma) caused by the incline of the two cylinder mirrors relative to the optical axis occurs.

In order to solve the above problem, an Offner-triplet structure of FIG. 2c (plan view) and FIG. 2d (side view) has been devised.

Referring to FIGS. 2c and 2d, the Offner-triplet structure includes a single diffraction grating 131, two spherical mirrors (respectively designated as 'first spherical mirror' and 'second spherical mirror') 132 and 133 having different sizes, and a single roof prism 134.

In the above construction, the roof prism 134 performs the same function as the roof mirror of FIG. 2a.

The second spherical mirror 133 is larger than the first spherical mirror 132.

The optical path of the Offner-triplet structure is described. After light is incident on and diffracted from the diffraction grating 131, the diffracted light is incident on and reflected from the second spherical mirror 133. After the reflected light is incident on and reflected from the first spherical mirror 132, the reflected light is incident on and reflected from the second spherical mirror 133 again. The reflected light is incident on and diffracted from the diffraction grating 131 again, and the diffracted light is incident on the roof prism 134. The incident light is reflected from the roof prism 134 at a changed height. The reflected light passes through the diffraction grating 131, the second spherical mirror 133, and the first spherical mirror 132, and is then output through the second spherical mirror 133 and the diffraction grating 131.

In this case, a corresponding separation distance is represented by $2(R-s)$, where R denotes the radius of curvature of the second spherical mirror 133, and s denotes the distance from the second spherical mirror 133 to the diffraction grating 131.

FIG. 2e is a graph showing signal chirping performed through the antiparallel diffraction grating structure in the conventional optical pulse stretcher.

FIG. 2e illustrates the results of computer simulation of the signal chirping generated by a typical optical pulse stretcher. In the simulation with the Offner-triplet structure of FIGS. 2c and 2d, parameters for the diffraction gratings are set as follows. That is, first-order diffraction is used, the number of grooves of the diffraction grating is set to 1740 lines/mm, the angle of incidence is set to 62.8°, the angle of diffraction is set to 70.8°, and a corresponding separation distance is set to 530 mm.

As a result, the signal having an 8 nm spectrum ranging from 1050 nm to 1058 nm) centered on a wavelength of 1054 nm is stretched by about 800 ps. Such a value (800 ps) is the value obtained by dividing an optical path-length difference by the speed of light, where the optical path-length difference is 240 mm, and the speed of light is three hundred thousand km/s.

For reference, laser light having passed through the optical pulse stretcher has a pulse structure which is temporally stretched according to wavelength. In this case, the reason an optical pulse is temporally stretched according to wavelength is described below. That is, ultrashort laser light includes laser light having different wavelength components. Accordingly, as light passes through the diffraction grating structure for respective wavelength components, the light travel distance thereof varies, and consequently an optical pulse is temporally stretched due to the difference between the temporal delays of respective wavelength components, attributable to the variation in light travel distance.

FIG. 3a is a diagram showing the construction of the optical pulse compressor of the conventional OPCPA apparatus.

Referring to FIG. 3a, the parallel diffraction grating structure includes two diffraction gratings 141 and 142 having a parallel arrangement, and a single roof mirror 143 for reflecting incident light at a changed height.

The optical path thereof is described below. After light is incident on and diffracted from the first diffraction grating 141, the diffracted light is incident on and diffracted from the second diffraction grating 142. The diffracted light is incident on the roof mirror 143, and is reflected from the roof mirror 143 at a changed height. The reflected light is output through the second diffraction grating 142 and the first diffraction grating 141.

In this case, the corresponding separation distance can be represented by the distance between the two diffraction gratings 141 and 142.

FIG. 3b is a graph showing signal chirping performed by a parallel diffraction grating structure in the conventional optical pulse compressor.

FIG. 3b illustrates the results of computer simulation of the signal chirping structure generated in a typical optical pulse compressor. In the parallel diffraction grating structure of FIG. 3b, parameters for diffraction gratings are set as follows. That is, −1st-order diffraction is used, the number of grooves of each diffraction grating is set to 850 lines/mm, the angle of incidence is set to 5.0°, the angle of diffraction is set to 79.4°, and a corresponding separation distance is set to 692 mm.

As a result, a signal having an 8 nm spectrum centered on a wavelength of 1054 nm is temporally stretched by about 800 ps. In this case, the optical path-length difference is about 240 mm.

Further, such an optical pulse compressor can temporally compress the signal, which has an 8 nm spectrum centered on a wavelength of 1054 nm and which has been temporally stretched by a typical optical pulse stretcher by about 800 ps, to the original state thereof.

Next, the operation and effects of the conventional OPCPA apparatus are described below.

First, an original signal passes through the optical pulse stretcher 10 having the construction of FIGS. 2a to 2d, so that a temporally stretched waveform, in which a long wavelength precedes a short wavelength, is output (refer to FIG. 4).

The output light (signal) of the optical pulse stretcher 10 is incident on a first pump-injection dichroic mirror 81 through the beam path changing mirrors 71 and 72, and the pump light output from the first pump laser 21 is also incident on the first pump-injection dichroic mirror 81.

Both the signal and pump are incident on the first OPA unit 31. In the first OPA unit 31, as the signal is amplified using the pump, an idler is generated, and the pump itself is attenuated.

Consequently, the output light of the first OPA unit 31 includes the pump, the amplified signal, and the idler.

The output light is incident on the first pump-removal dichroic mirror 41, and is separated into the amplified signal and remaining light (pump and idler). That is, both the attenuated pump and the idler pass through the first pump-removal dichroic mirror 41 and are removed by the first beam dumper 51, and the amplified signal is reflected from the first pump-removal dichroic mirror 41.

If the amplified signal succeeds in reaching the level of aimed intensity or more, the amplified signal is incident on the optical pulse compressor 60, otherwise, it undergoes the above process again (process from the pump-injection dichroic mirror to the beam dumper).

That is, if the signal (amplified signal) reflected from the first pump-removal dichroic mirror 41 fails in reaching the level of aimed intensity or more, the signal is incident on the other pump-injection dichroic mirror (second pump-injection dichroic mirror) 82, and the pump generated from the second pump laser 22 is also incident on the second pump-injection dichroic mirror 82. Thereafter, the signal and the pump pass through the second OPA unit 32, the second pump-removal dichroic mirror 42, and the second beam dumper 52. The above process is repeated until the above signal is amplified to a predetermined intensity or more.

Finally, the amplified signal is incident on the optical pulse compressor 60, and the optical pulse compressor 60 temporally compresses the amplified signal.

However, the conventional OPCPA apparatus has the following problems.

That is, the conventional OPCPA apparatus forms a linear pulse chirping structure using second-order dispersion (Group Velocity Dispersion: GVD). However, such a structure is problematic in that, since the second-order dispersion terms in the signal and idler, which are the output light of the OPA unit, have the same magnitude and have opposite signs, compensation for pulse chirping is difficult in the optical pulse compressor. Therefore, an idler having energy intensity roughly equal to that of the amplified signal cannot be generally utilized, and must be discarded.

For a detailed description of dispersion, reference may be made to FIG. 7.

DISCLOSURE OF THE INVENTION

Accordingly, the present invention has been made keeping in mind the above problems occurring in the prior art, and an object of the present invention is to provide a an Optical Parametric Chirped Pulse Amplification (OPCPA) apparatus, in which both an optical pulse stretcher and an optical pulse compressor use third-order dispersion, which is odd-order dispersion, and in which both a signal and an idler, among the output light of an OPA unit, are used together to double a wavelength bandwidth as well as an energy amplification factor, thus not only compensating for spectrum loss, but also obtaining laser light having a temporal pulse width shorter than that of an original signal.

The purpose of using odd-order dispersion in the above construction is described as follows.

That is, even-order dispersion, such as conventional second-order dispersion (group velocity dispersion) and fourth-order dispersion, is disadvantageous in that, since the terms of a signal and an idler have the same magnitude and have opposite signs when OPCPA is performed, it is difficult to perform simultaneous compensation in the optical pulse compressor. In contrast, odd-order dispersion, such as third-order dispersion as used in the present invention, is advantageous in that, since the terms of a signal and an idler have the same magnitude and sign, compensation is facilitated in the optical pulse compressor.

For reference, it is difficult to utilize both an amplified signal and an idler together in the conventional OPCPA apparatus. The reason for this is described below.

First, since angular dispersion of an idler occurs in noncollinear phase-matching, which is generally used in broadband optical parametric amplification, beams spatially travel in different directions according to wavelength when traveling later, and thus it is difficult to find a means capable of sufficiently correcting the angular dispersion.

Second, the problem of angular dispersion of an idler can be solved by matching the polarization of the idler with ordinary light (ordinary wave) while utilizing collinear phase matching to use the idler, but it is generally difficult to obtain sufficiently broadband gain to the extent that the gain is uniformly distributed throughout the broad spectrum of a signal corresponding to an ultrashort signal.

Third, in special cases, broadband gain enabling sufficient amplification of the entire spectrum of a signal may be occasionally obtained in spite of collinear phase matching, but, in this case, both the amplified signal and the idler have pulses that are chirped in opposite directions (opposite chirp-state of the amplified signal and the idler), and thus it is impossible to recover the temporal pulse width to the original width using only a typical optical pulse compressor.

In order to accomplish the above object, the present invention provides an Optical Parametric Chirped Pulse Amplification (OPCPA) apparatus, comprising an optical pulse stretcher for outputting chirped laser light using odd-order dispersion (mainly, third order dispersion); a pump laser for outputting pump laser light; an optical parametric amplification unit for receiving the pump laser light and the chirped laser light (signal), amplifying the signal using the pump laser light, and generating an idler; an optical signal separation unit for separating output light of the optical parametric amplification unit into the signal, the idler and remaining light (pump); and an optical pulse compressor for compensating for pulse chirping caused by the odd-order dispersion that is imparted by the optical pulse stretcher, thus temporally compressing together the signal and the idler, which overlap each other, wherein the following relational expression is satisfied upon performing collinear phase matching, <relational expression>$\lambda_s \approx 2\lambda_p \approx \lambda_i$ where $\lambda_s$ is a wavelength of the signal, $\lambda_p$ is a wavelength of the pump, and $\lambda_i$ is a wavelength of the idler.

Preferably, each of the optical pulse stretcher and the optical pulse compressor may be implemented to use a half of a U-shaped chirping structure, which uses third-order dispersion, for the signal and to use a remaining half thereof for the idler.

Preferably, the optical pulse stretcher may apply chirping allowing a center wavelength to follow a surrounding wavelength and allowing the surrounding wavelength to precede the center wavelength, or may apply chirping allowing a center wavelength to precede a surrounding wavelength and allowing the surrounding wavelength to follow the center wavelength.

Preferably, the OPCPA apparatus may further comprise means for eliminating residual even-order dispersion (that is, fourth-order dispersion, etc.).

Preferably, the even-order dispersion elimination means may be one of an acousto-optic filter and a chirp mirror.

Preferably, the even-order dispersion elimination means may be placed on an optical path located upstream of the optical parametric amplification (OPA) unit.

Preferably, the optical pulse stretcher may be implemented such that an antiparallel diffraction grating structure and a parallel diffraction grating structure are arranged in series, thus eliminating second-order dispersion (group velocity dispersion) when pulse chirping is performed.

Preferably, the optical pulse compressor may be implemented such that an antiparallel diffraction grating structure and a parallel diffraction grating structure are arranged in series.

Preferably, values of parameters for diffraction gratings to be used in the antiparallel diffraction grating structure and the parallel diffraction grating structure may be differently applied.

Preferably, the optical pulse stretcher and the optical pulse compressor may be designed such that the values of the parameters for the diffraction gratings to be used in the antiparallel diffraction grating structure and the parallel diffraction grating structure of the optical pulse stretcher are respectively the same as the values of the parameters for the diffraction gratings to be used in the parallel diffraction grating structure and the antiparallel diffraction grating structure of the optical pulse compressor.

Preferably, the parallel diffraction grating structure may comprise two diffraction gratings having a parallel arrangement, and a single roof mirror for reflecting incident light at a changed height.

Preferably, the optical parametric amplification unit may be implemented using a nonlinear optical medium, and the nonlinear optical medium may be one of Beta Barium Borate (BBO), Lithium Triborate (LBO), Potassium Titanyl Phosphate (KTP), and Potassium Dihydrogen Phosphate (KDP).

Preferably, the optical signal separation unit may be a pump-removal dichroic mirror for reflecting the idler and the amplified signal, output from the optical parametric amplification unit, and passing remaining light (pump) therethrough, thus separating the output light of the optical parametric amplification unit into the idler, the amplified signal, and the remaining light.

Preferably, the OPCPA apparatus may further comprise a beam dumper for removing the pump separated by the optical signal separation unit.

Preferably, the OPCPA apparatus may further comprise a mirror (pump-injection dichroic mirror) for receiving output light of both the optical pulse stretcher and the pump laser and transmitting the output light to the optical parametric amplification unit.

Preferably, the OPCPA apparatus may further comprise a beam path changing mirror placed downstream of the optical pulse stretcher and adapted to change a path of incident light toward a pump-injection dichroic mirror.

Preferably, the OPCPA apparatus may further comprise a beam path changing mirror for changing paths of the signal and idler, separated by the optical signal separation unit, toward the optical pulse compressor.

BRIEF DESCRIPTION OF THE DRAWINGS

FIG. 1b is a detailed diagram showing the construction of the OPCPA apparatus of FIG. 1a;

FIG. 7c is a graph showing the derivation of the values indicated in the graph of FIG. 7a;

FIGS. 10a and 10b are graphs showing the chirped states of a signal and an idler, which are the output light of the OPA unit of the OPCPA apparatus according to the present invention.

DESCRIPTION OF REFERENCE CHARACTERS OF IMPORTANT PARTS

Figure 1A:
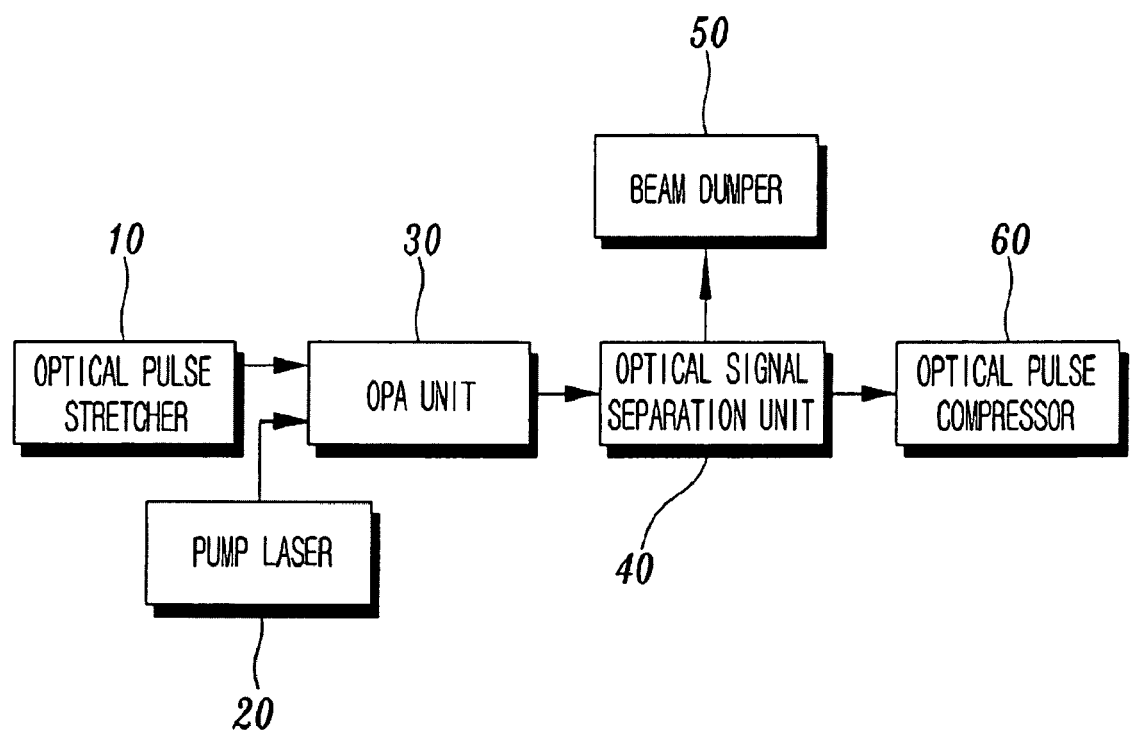
FIG. 1a is a simple diagram showing a conventional OPCPA apparatus.
Figure 1B:
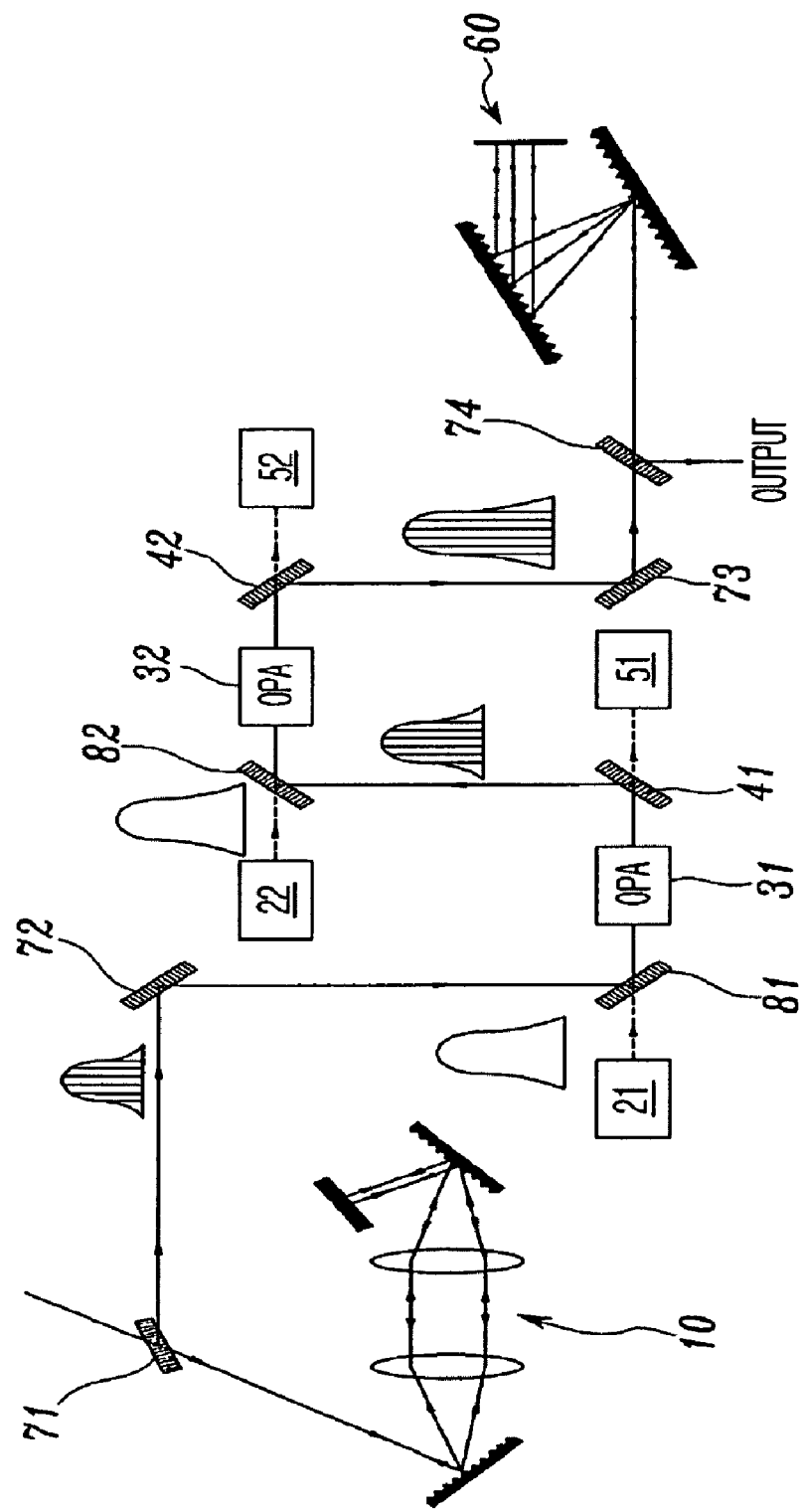

100: optical pulse stretcher 200: pump laser
300: optical parametric amplification (OPA) unit
400: optical signal separation unit (pump-removal dichroic mirror)
500: beam dumper 600: optical pulse compressor
710 to 770: beam path changing mirror
800: pump-injection dichroic mirror

BEST MODE FOR CARRYING OUT THE INVENTION

Hereinafter, embodiments of the present invention will be described in detail with reference to the attached drawings.

Figure 5:
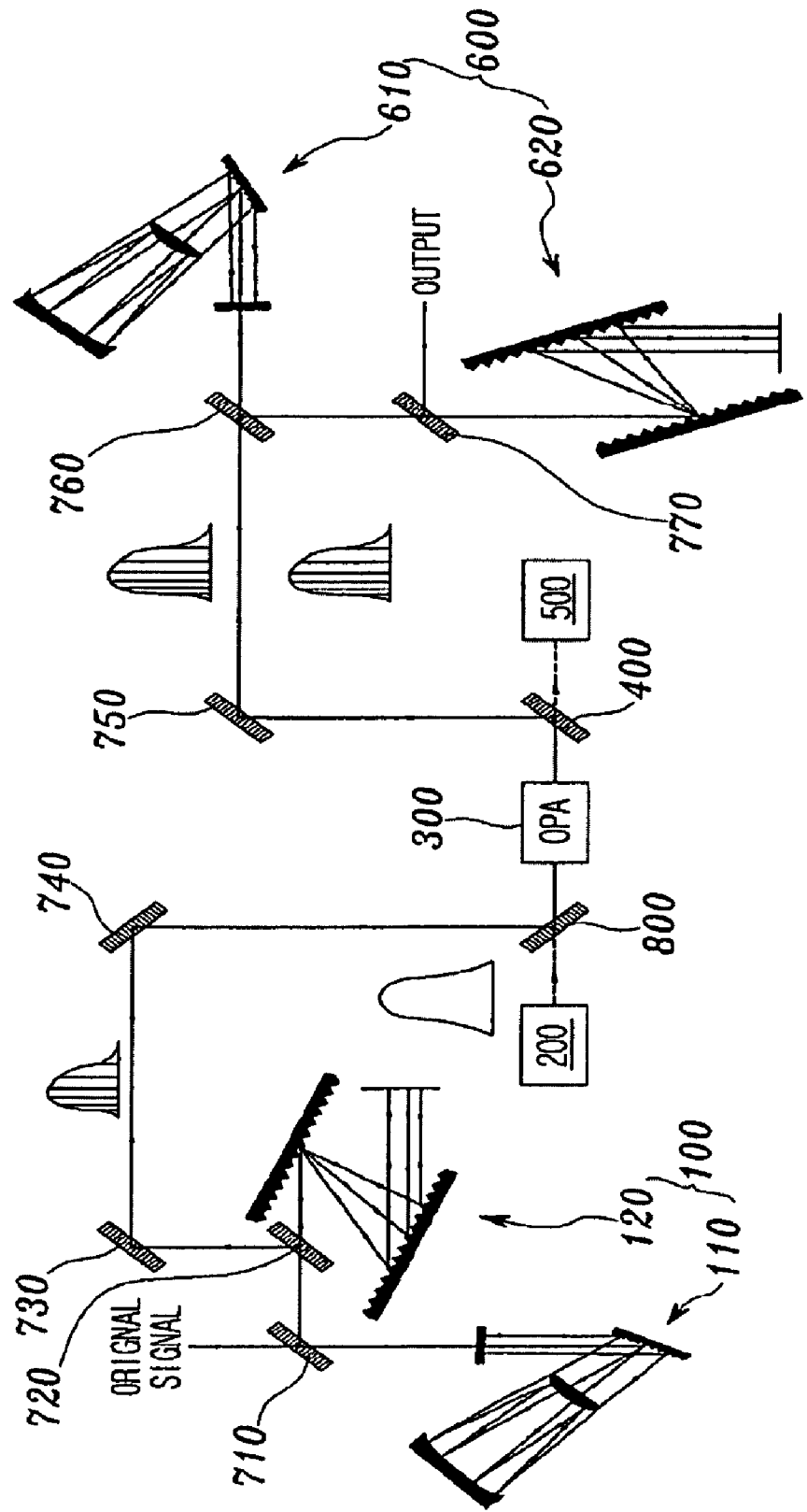
FIG. 5 is a detailed diagram showing the construction of an OPCPA apparatus according to the present invention.

FIG. 5 is a detailed diagram showing the construction of an Optical Parametric Chirped Pulse Amplification (OPCPA) apparatus according to the present invention.

Referring to FIG. 5, the OPCPA apparatus of the present invention includes an optical pulse stretcher 100, a pump laser 200, an Optical Parametric Amplification (OPA) unit 300, an optical signal separation unit 400, a beam dumper unit (beam dumper) 500, and an optical pulse compressor 600.

Figure 9:
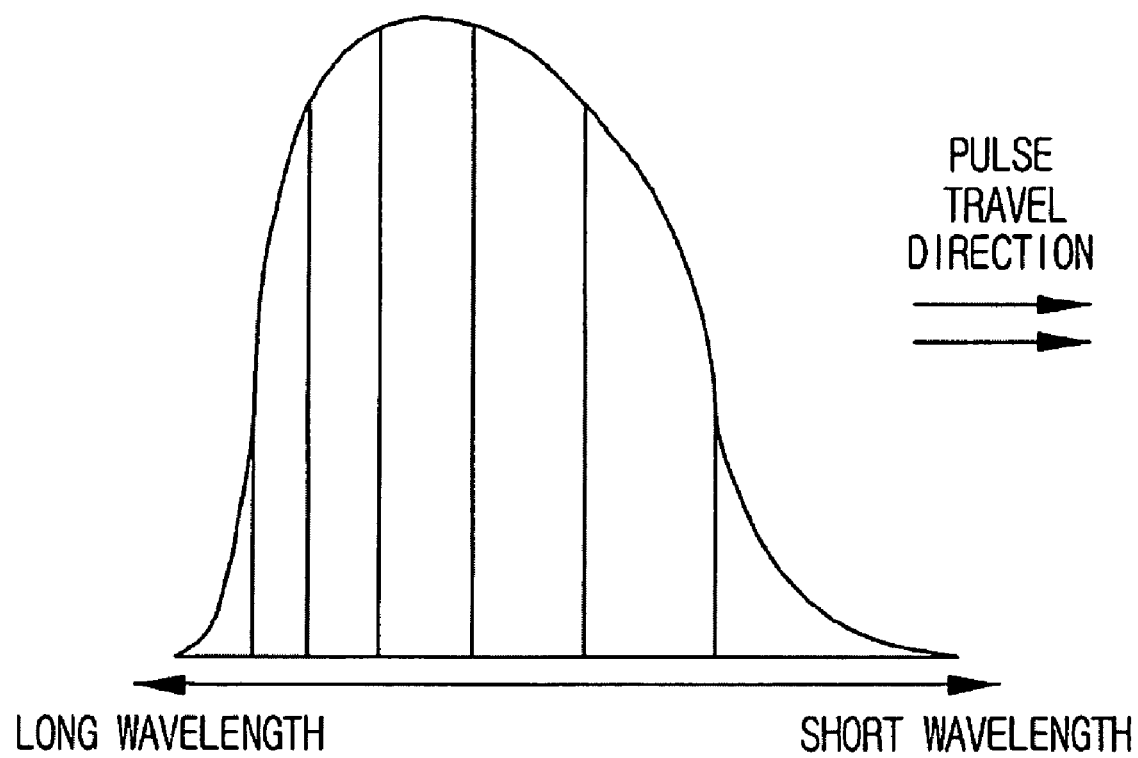
FIG. 9 is a graph showing the chirped state of an original signal that is stretched through the optical pulse stretcher (using third-order dispersion) of the OPCPA apparatus according to the present invention.

The optical pulse stretcher 100 is a device for temporally stretching laser light by varying the optical path thereof for each frequency, but applies short-wavelength (or long-wavelength) preceding-type chirping (refer to FIG. 9). That is, the optical pulse stretcher 100 temporally stretches the length of the pulse (pulse duration) of the output light of an ultrashort laser from an original band of several femtoseconds (fs; $10^{-15}$ seconds)/several tens of picoseconds (ps; $10^{-12}$ seconds) to a band of several hundreds of picoseconds (ps; $10^{-12}$ seconds)/several nanoseconds (ns; $10^{-9}$ seconds).

In the case of a hybrid Chirped Pulse Amplification (CPA) apparatus, in which an OPCPA apparatus and a typical CPA apparatus are combined with each other, the optical pulse stretcher 100 of the present invention is preferably implemented so that a wavelength far away from a center wavelength precedes a wavelength close to the center frequency. However, from the standpoint only of the present invention, a structure such that a wavelength close to the center wavelength precedes a surrounding wavelength, which is far away from the center wavelength, and a structure such that a surrounding wavelength far away from the center wavelength precedes a wavelength close to the center wavelength can be considered to be the same structure, in which there is no difference in principle.

The optical pulse stretcher 100 of the present invention uses odd-order dispersion, unlike the conventional optical pulse stretcher.

Further, the OPCPA apparatus of the present invention may include a component for eliminating even-order dispersion. Such a component will be described later, together with the optical pulse stretcher and the optical pulse compressor of FIG. 6, and thus a detailed description thereof is omitted here.

The pump laser 200 is a device for outputting pump laser light (pump).

The OPA unit 300 amplifies the signal using the pump, and generates an idler. Accordingly, the pump itself is attenuated to a corresponding degree by the energy conservation.

In detail, the incident light of the OPA unit 300 includes light output from the pump laser 200 (pump), and light output from the optical pulse stretcher 100 (signal), and the output light of the OPA unit 300 includes the attenuated pump, the amplified signal, and the idler.

The OPA unit 300 is preferably implemented using a nonlinear optical medium. The nonlinear optical medium may include Potassium Titanyl Phosphate (KTP), Potassium Dihydrogen Phosphate (KDP), Lithium Triborate (LBO), Beta-Barium Borate (BBO), etc. The nonlinear optical medium has an anti-reflection coating for the wavelengths of a pump, a signal, and an idler. In this case, the manufacture of nonlinear optical crystals and the design of a phase matching configuration vary according to the wavelengths of the pump and the signal.

The OPA unit 300 realizes a nearly degenerated signal-pump relationship. In the prior art, the relationship of $\lambda_s < 2\lambda_p < \lambda_i$ or $\lambda_s > 2\lambda_p, \lambda_i$ is generally satisfied, whereas, in the present invention, the relationship of $\lambda_s \approx 2 \lambda_p \approx \lambda_i$ must be satisfied.

In this case, $\lambda_s$ denotes the wavelength of a signal, $\lambda_p$ is the wavelength of a pump, and $\lambda_i$ is the wavelength of an idler.

If the above relational expression is satisfied, most OPA gains can be obtained as broadband gains even under collinear phase matching (refer to FIG. 8).

The optical signal separation unit 400 separates light output from the OPA unit 300 into a part that is desired to be removed and a part that is desired to be transmitted to a subsequent stage (for example, the optical pulse compressor). The beam dumper 500 removes the optical signal that is desired to be removed and has been separated by the optical signal separation unit 400.

The optical signal separation unit 400 may include a pump-removal dichroic mirror, as an example, and the pump-removal dichroic mirror functions to pass light that is desired to be removed therethrough, and to reflect light that is desired to be transmitted to a subsequent stage.

In detail, the pump-removal dichroic mirror 400 has a broadband high-reflection coating for the wavelengths of an idler and a signal, and has an anti-reflection coating for the wavelength of a pump. Accordingly, the incident light of the pump-removal dichroic mirror 400 can be separated into the idler and remaining light (signal and attenuated pump) by the pump-removal dichroic mirror.

The attenuated pump is removed by the beam dumper 500.

Of course, the present invention can inversely perform the function of the pump-removal dichroic mirror depending on the principles thereof. That is, the pump-removal dichroic mirror may reflect light that is desired to be removed, and may pass light that is desired to be transmitted to a subsequent stage, and thus a beam dumper may be provided at a corresponding location in order to remove the reflected light. However, in practice, a dichroic mirror is preferably designed to reflect output light, which will be transmitted to a subsequent stage, in order to avoid the dispersion in output light.

As described above, in the present invention, the pump of the output light of the OPA unit is removed, and the amplified signal and the idler thereof are incident on the optical pulse compressor 600.

The optical pulse compressor 600 compensates for pulse chirping caused by odd-order dispersion that is imparted by the optical pulse stretcher 100, thus temporally compressing the overlapping signal and idler together. Then, the OPCPA apparatus of the present invention can increase an energy amplification factor to be about twice as large as that of the conventional OPCPA apparatus, and can also double the wavelength bandwidth thereof.

In the present invention, a pump-injection dichroic mirror 800 is preferably provided upstream of the OPA unit 300.

The pump-injection dichroic mirror 800 functions to receive a pump and a signal, and to transmit the pump and the signal to a subsequent stage (OPA unit).

That is, the pump-injection dichroic mirror 800 has an anti-reflection coating for the wavelength of the pump, and a broadband high-reflection coating for the wavelength of the signal. Accordingly, the pump-injection dichroic mirror 800 can simultaneously receive both the output light (signal) of the optical pulse stretcher, which has been reflected from a beam path changing mirror, and the output light (pump) of the pump laser.

In an embodiment of the present invention, a plurality of beam path changing mirrors 730 to 750 is installed.

The beam path changing mirrors 730 to 750 are devices for changing an optical path so that light output from a previous stage can be successfully input to a subsequent stage. Each beam path changing mirror has a broadband high-reflection coating for the entire wavelength range of the signal.

For example, the beam path changing mirrors 730 and 740 are installed downstream of the optical pulse stretcher 100, and are adapted to change an optical path in order to allow the signal output from the optical pulse stretcher to be incident on the pump-injection dichroic mirror 800.

Further, the beam path changing mirror 750 is installed downstream of the pump-removal dichroic mirror 400, and is adapted to change an optical path in order to allow the output light (signal and idler) of the pump-removal dichroic mirror 400 to be incident on the optical pulse compressor 600.

Each of the optical pulse stretcher and the optical pulse compressor has a U-shaped chirping structure that uses third-order dispersion. In the present invention, a half of the U-shaped chirping structure is used for a signal, and the remaining half is used for an idler (refer to FIGS. 7a and 7b). Further, a pump having a wavelength corresponding to ½ of a center wavelength, which corresponds to the vertex of the U-shaped chirping structure, is used. For example, when a center wavelength of 1054 nm is used as the vertex of the U-shaped chirping structure, as in FIGS. 7a and 7b, the present invention uses a pump having a wavelength of 527 nm.

Further, the present invention preferably further includes a means for eliminating even-order dispersion (for example, fourth-order dispersion, etc.). For reference, the second-order dispersion is eliminated by the structure of the optical pulse stretcher and the optical pulse compressor (a series arrangement of an antiparallel diffraction grating structure and a parallel diffraction grating structure) (refer to FIG. 6).

The even-order dispersion elimination means is installed to prevent pulse compression efficiency from decreasing due to residual even-order dispersion (fourth-order dispersion, sixth-order dispersion, etc.) when pulse compression is performed by the optical pulse compressor.

The even-order dispersion elimination means includes a commercial Acousto-Optic filter (for example, a commercial Acousto-Optic Programmable Dispersive Filter: AOPDF, a Dazzler, etc.) or a chirp mirror, as the means for eliminating even-order dispersion.

The even-order dispersion elimination means is preferably disposed on the optical path located upstream of the OPA unit 300.

Figure 6A:
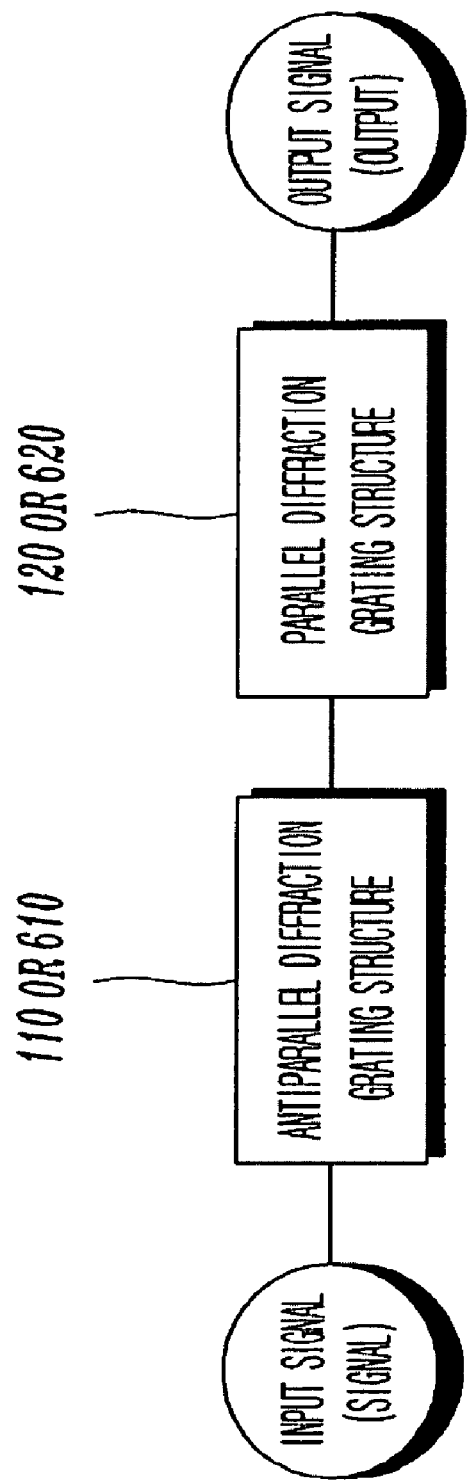
FIG. 6a is a simple block diagram of the optical pulse stretcher and the optical pulse compressor of the OPCPA apparatus according to the present invention.
Figure 6B:
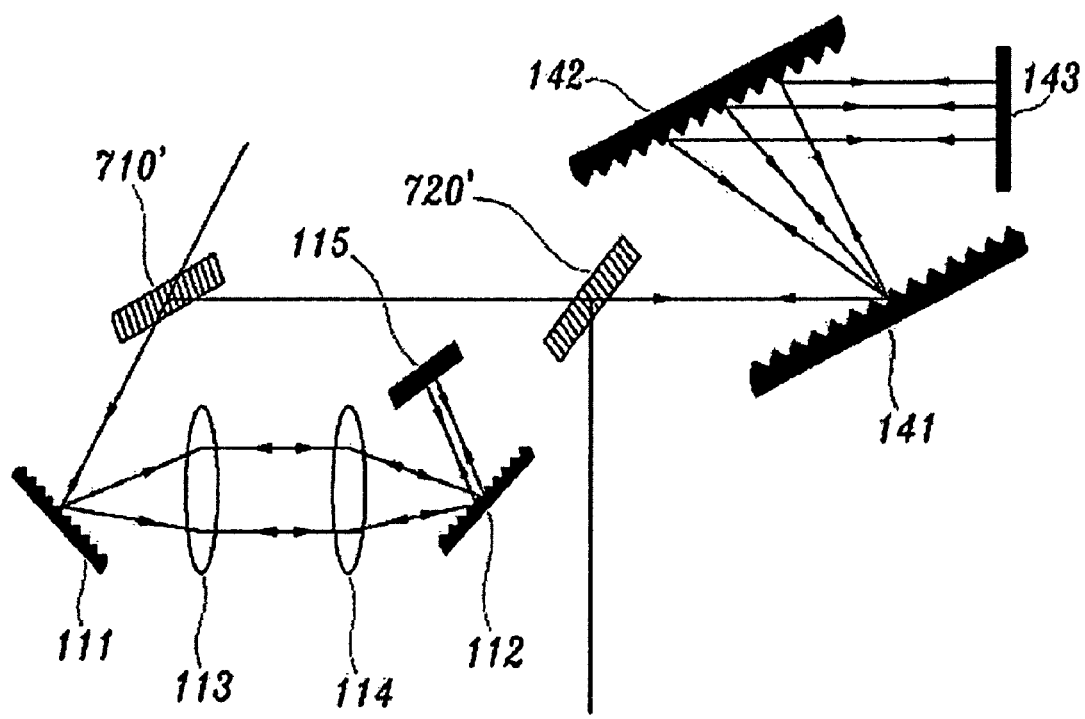
FIGS. 6b and 6c are detailed diagrams showing the construction of the optical pulse stretcher and the optical pulse compressor according to an embodiment of the present invention.
Figure 6C:
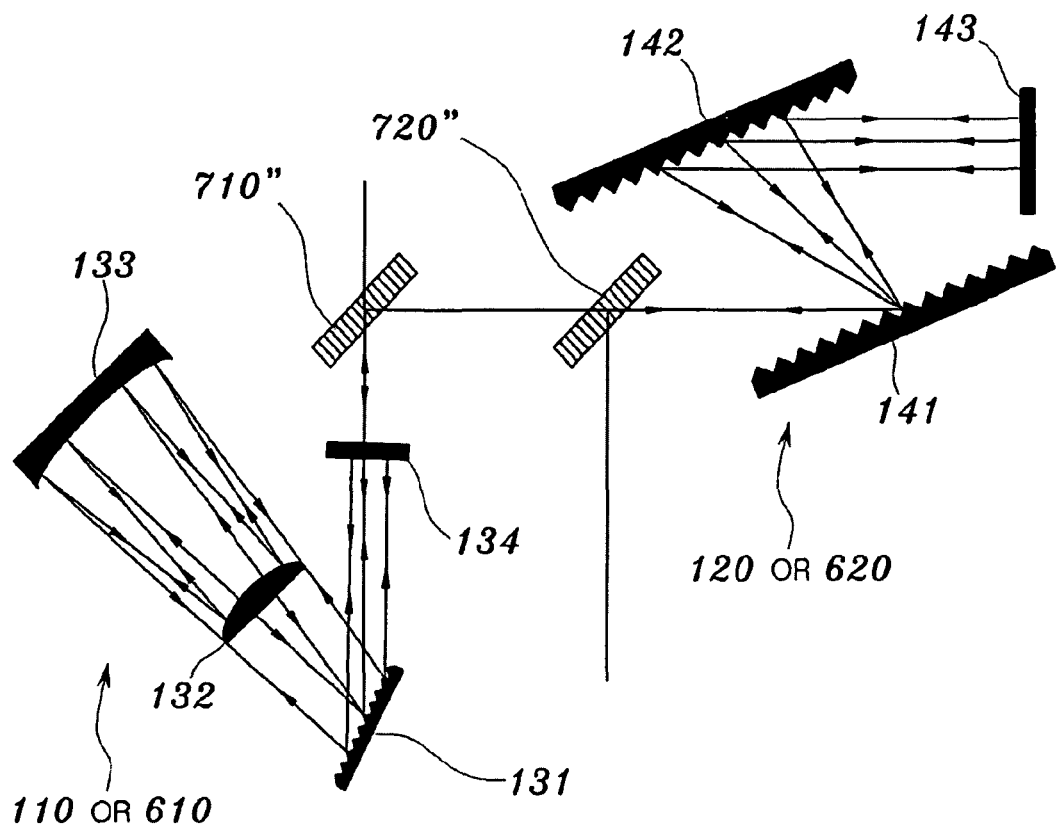

FIG. 6a is a simple block diagram showing the construction of the optical pulse stretcher and the optical pulse compressor of the OPCPA apparatus according to the present invention, and FIGS. 6b and 6c are detailed diagrams showing the construction of the optical pulse stretcher and optical pulse compressor according to an embodiment of the present invention.

First, referring to FIG. 6a, each of the optical pulse stretcher 100 and the optical pulse compressor 600 of the OPCPA apparatus is implemented using a series arrangement of an antiparallel diffraction grating structure and a parallel diffraction grating structure.

That is, in the present invention, an input signal (signal) first passes through the antiparallel diffraction grating structure and subsequently passes through the parallel diffraction grating structure. In this case, the input signal indicates an original signal in the case of the optical pulse stretcher, and indicates an amplified signal and an idler in the case of the optical pulse compressor.

As described above, if the antiparallel diffraction grating structure and the parallel diffraction grating structure are arranged in series, second-order dispersion (group velocity dispersion) can be eliminated at the time of pulse chirping, and third-order dispersion can be maximized (refer to FIG. 7).

In the present invention, the construction of the optical pulse stretcher and the optical pulse compressor can be implemented using a series arrangement of an antiparallel diffraction grating structure and a parallel diffraction grating structure, or reversely implemented using a series arrangement of a parallel diffraction grating structure and an antiparallel diffraction grating structure. However, in the present invention, each of the optical pulse stretcher and the optical pulse compressor is more preferably implemented using a series arrangement of an antiparallel diffraction grating structure and a parallel diffraction grating structure. The reason for this is that the two structures are the same in principle, but, in actual implementation, the adjustment of an optical system is facilitated at the time of eliminating second-order dispersion only when a parallel diffraction grating structure having a simpler structure is placed behind an antiparallel diffraction grating structure.

Figure 2A:
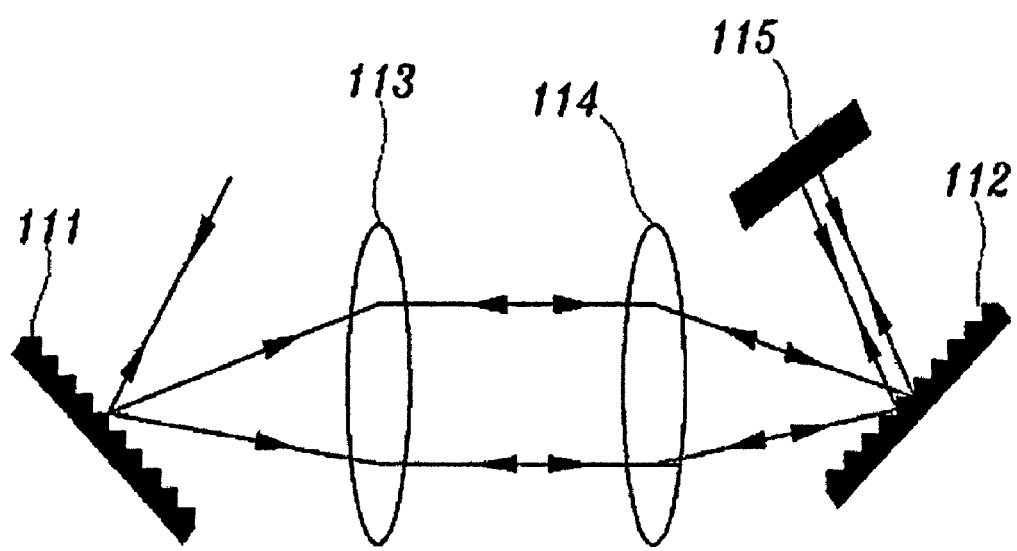
FIGS. 2a to 2d are diagrams showing the optical pulse stretcher of the conventional OPCPA apparatus.
Figure 2B:
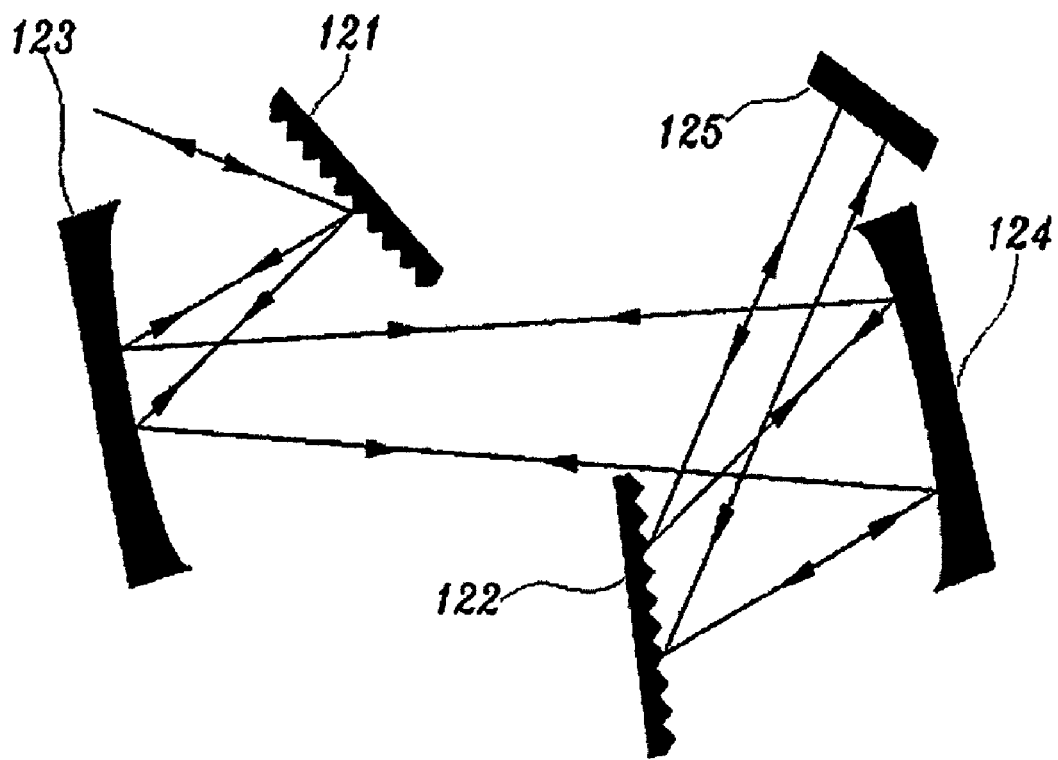
Figure 2C:
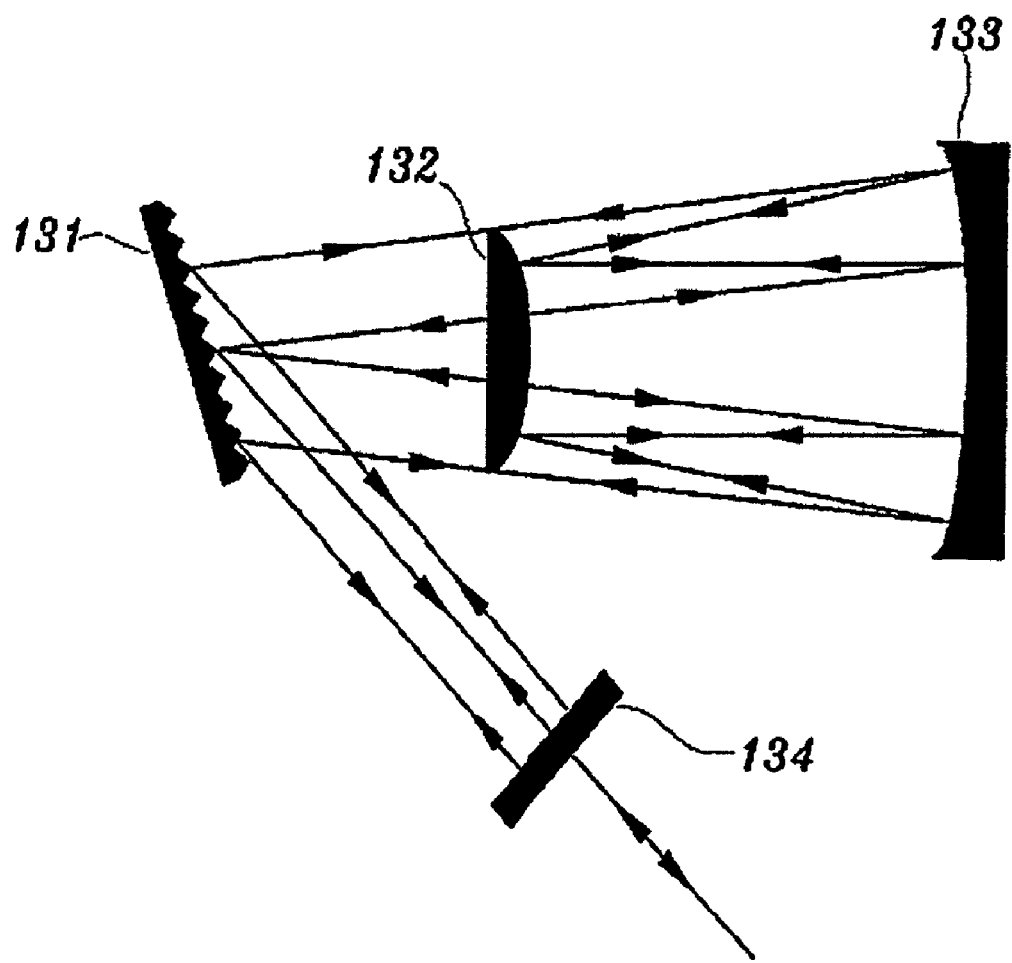
Figure 2D:
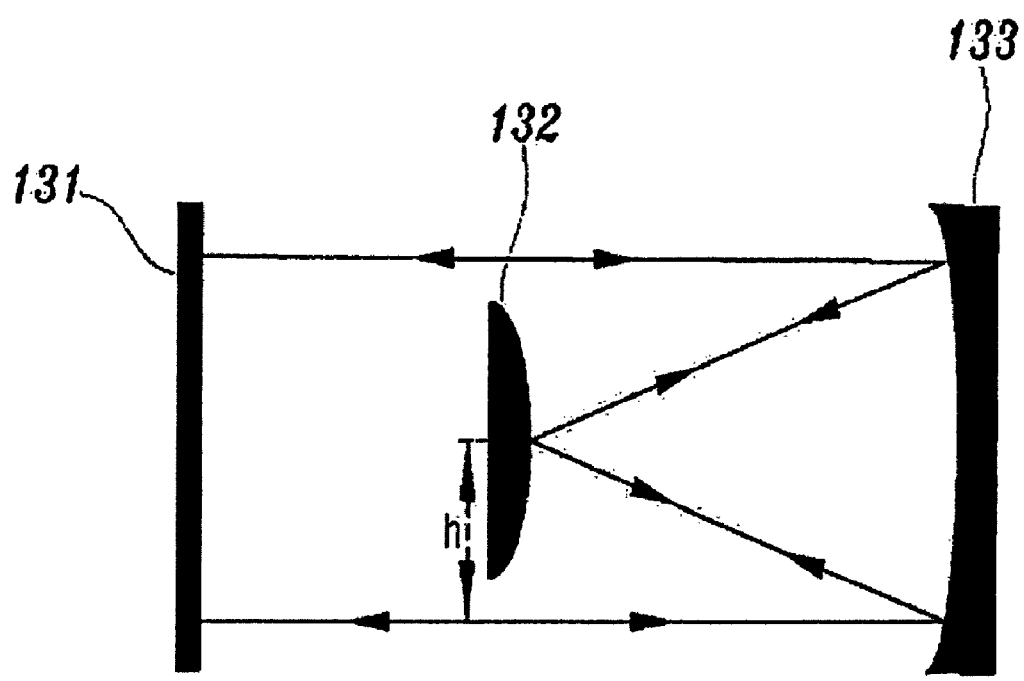
Figure 2E:
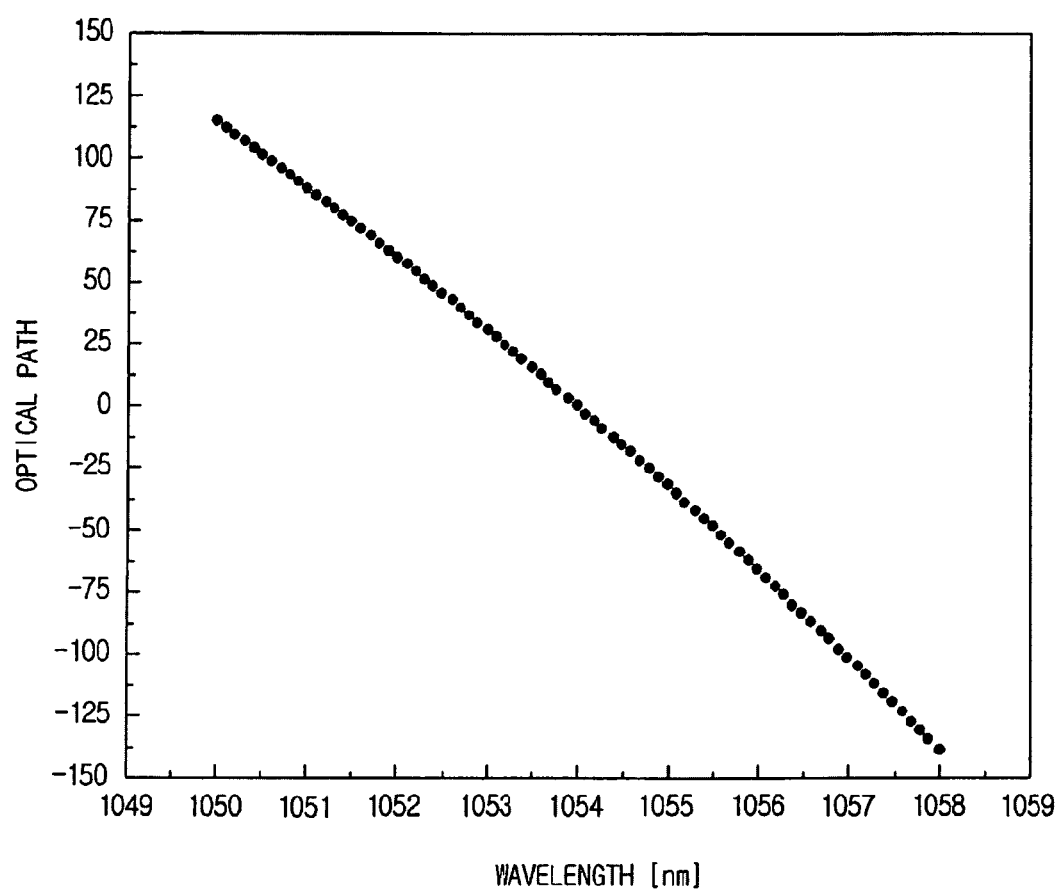
FIG. 2e is a graph showing signal chirping performed by an antiparallel diffraction grating structure in the conventional optical pulse stretcher.
Figure 3A:
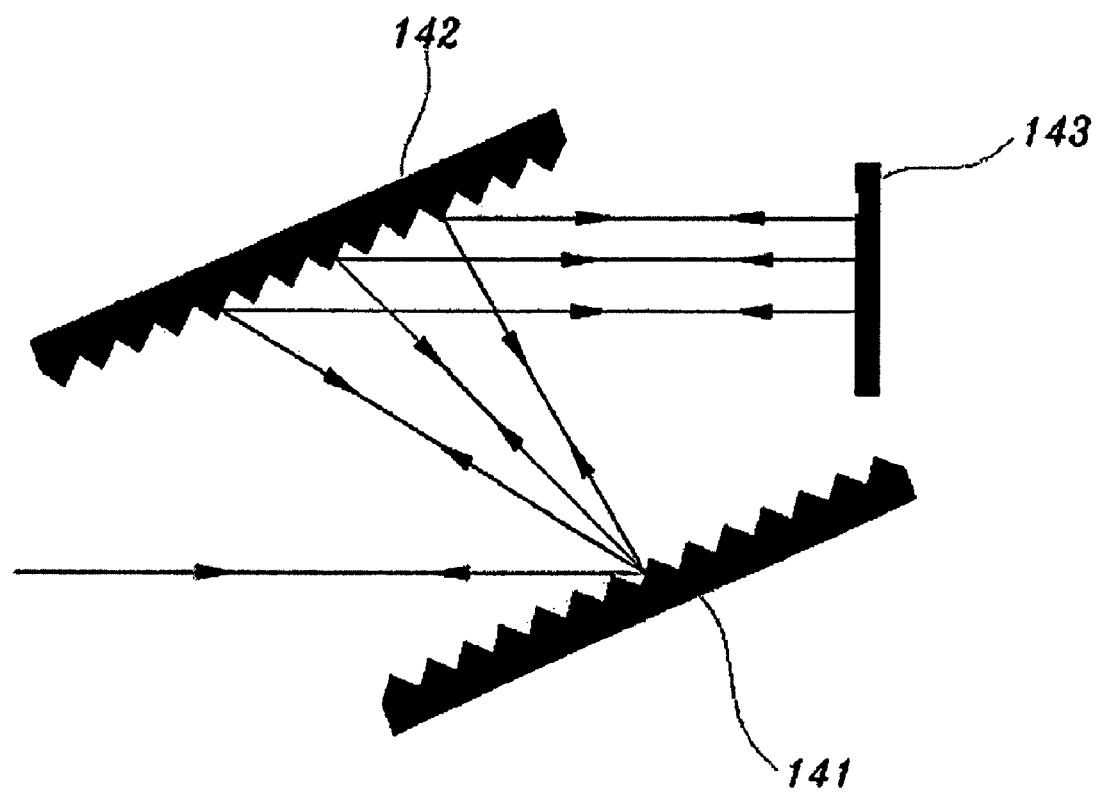
FIG. 3a is a diagram showing the optical pulse compressor of the conventional OPCPA apparatus.
Figure 3B:
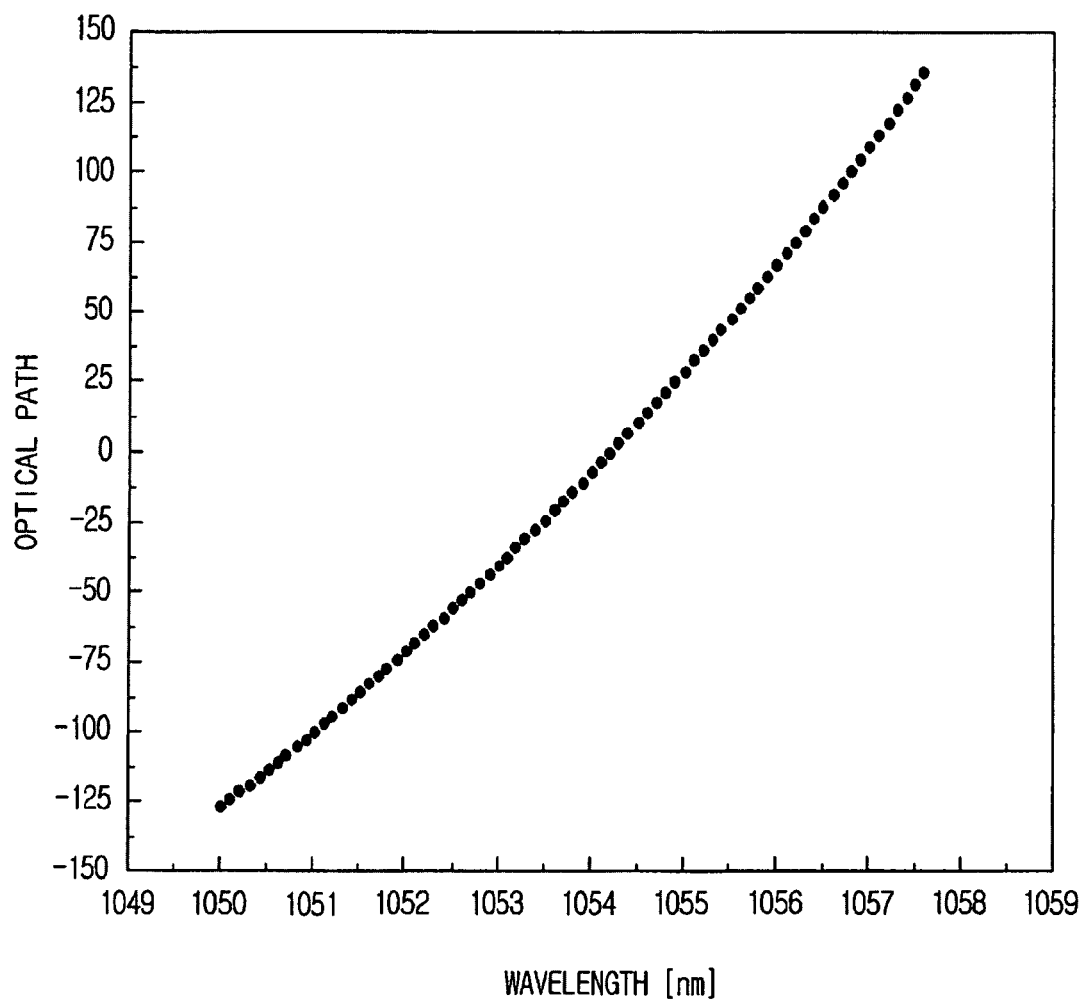
FIG. 3b is a graph showing signal chirping performed by a parallel diffraction grating structure in the conventional optical pulse compressor.
Figure 4:
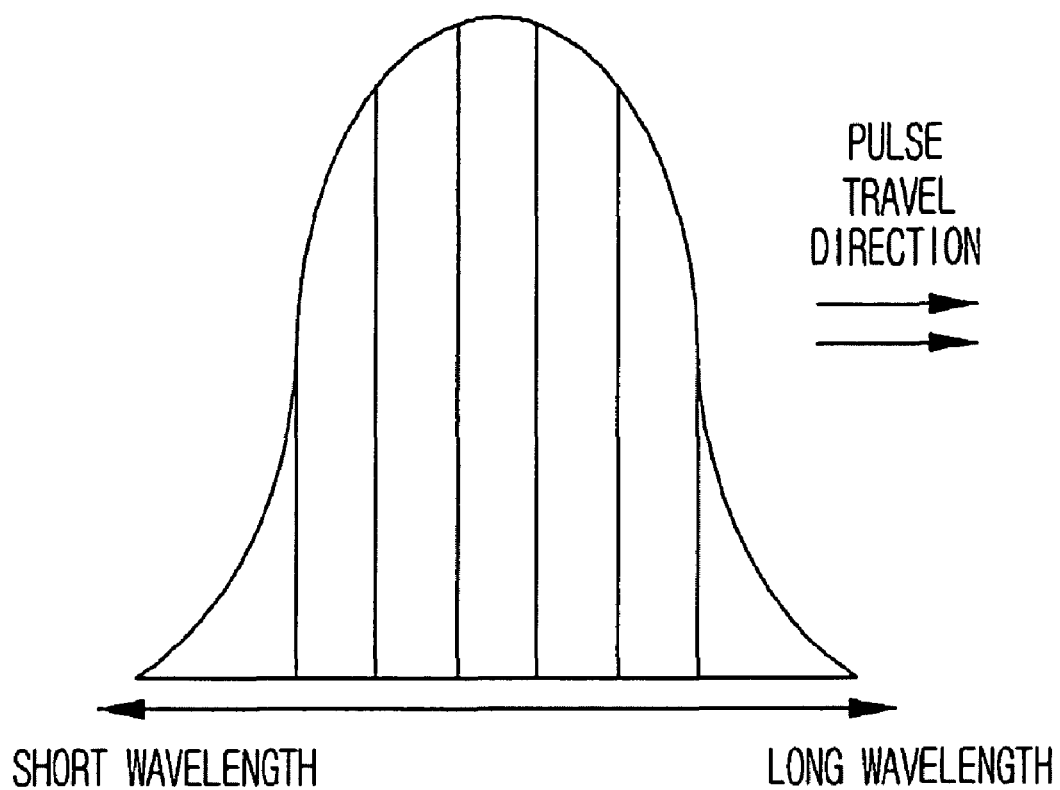
FIG. 4 is a diagram showing the output light (signal) of the optical pulse stretcher of the conventional OPCPA apparatus that mainly uses group velocity dispersion (second-order dispersion)

For the antiparallel structure, any of the antiparallel structures of FIGS. 2a to 2d can be used, but the antiparallel diffraction grating structure (Offner-triplet) of FIGS. 2c and 2d is most preferably used.

Such a structure is described in detail with reference to FIGS. 6b and 6c.

In FIG. 6b, each of the optical pulse stretcher and the optical pulse compressor is implemented using a series arrangement of an antiparallel diffraction grating structure (refraction type) and a parallel diffraction grating structure.

The optical path thereof is described. After an input signal (light) is incident on and diffracted from the first diffraction grating 111 of the antiparallel diffraction grating structure (refraction type), the diffracted light passes through two lenses 113 and 114, and is then incident on and diffracted from a second diffraction grating 112. The diffracted light is incident on a roof mirror 115, and is reflected from the roof mirror 115 at a changed height. The reflected light is reflected through the second diffraction grating 112, the two lenses 114 and 113, and the first diffraction grating 111. The reflected light is incident on the first diffraction grating 141 of the parallel diffraction grating structure after the beam path of the reflected light has been changed by beam path changing mirrors 710' and 720'. The incident light is diffracted from the first diffraction grating 141 and is incident on and diffracted from a second diffraction grating 142. The diffracted light is incident on a roof mirror 143, and is then reflected from the roof mirror 143 at a changed height. The reflected light is output through the second diffraction grating 142 and the first diffraction grating 141.

Further, in FIG. 6c, each of the optical pulse stretcher and the optical pulse compressor is implemented using a series arrangement of an antiparallel diffraction grating structure (Offner-triplet type) and a parallel diffraction grating structure.

The optical path thereof is described. After an input signal (light) is incident on and diffracted from the diffraction grating 131 of the antiparallel diffraction grating structure (Offner-triplet type), the diffracted light is incident on and reflected from a second spherical mirror 133. After the reflected light is incident on and reflected from a first spherical mirror 132, the reflected light is incident on and reflected from the second spherical mirror 133 again. The reflected light is incident on and diffracted from the diffraction grating 131 again, and then the diffracted light is incident on a roof prism 134. The incident light is reflected from the roof prism 134 at a changed height. The reflected light passes through the diffraction grating 131, the second spherical mirror 133, and the first spherical mirror 132, and is then output through the second spherical mirror 133 and the diffraction grating 131.

Then, the beam path of the output light is changed by the beam path changing mirrors 710" and 720", and the output light is incident on the first diffraction grating 141 of the parallel diffraction grating structure. The incident light is diffracted from the first diffraction grating 141, and is then incident on and diffracted from a second diffraction grating 142. The diffracted light is incident on a roof mirror 143, and is reflected from the roof mirror 143 at a changed height. The reflected light is output through the second diffraction grating 142 and the first diffraction grating 141.

Figure 7A:
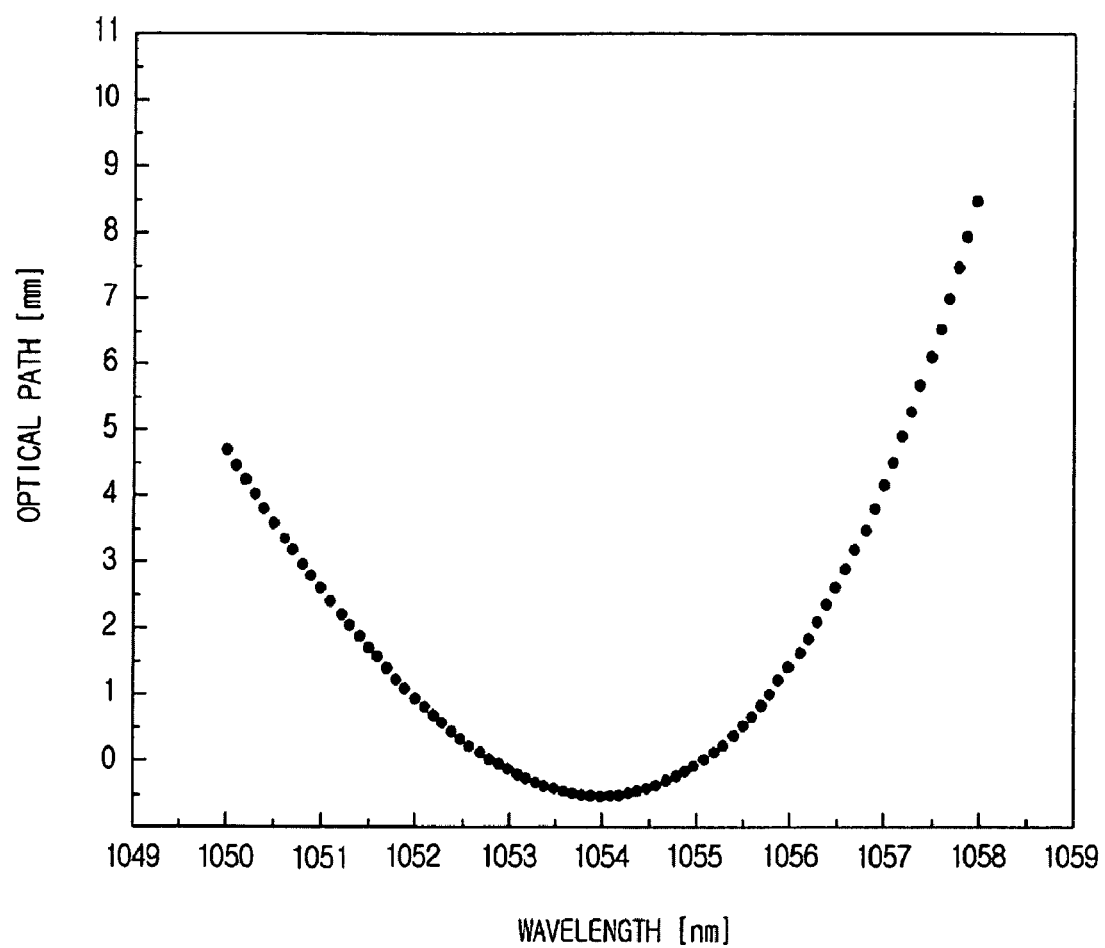
FIG. 7a is a graph showing the results of computer simulation of a signal chirping structure generated in a U-shaped chirped pulse generator, in which an antiparallel diffraction grating structure and a parallel diffraction grating structure are arranged in series, according to the present invention.
Figure 7B:
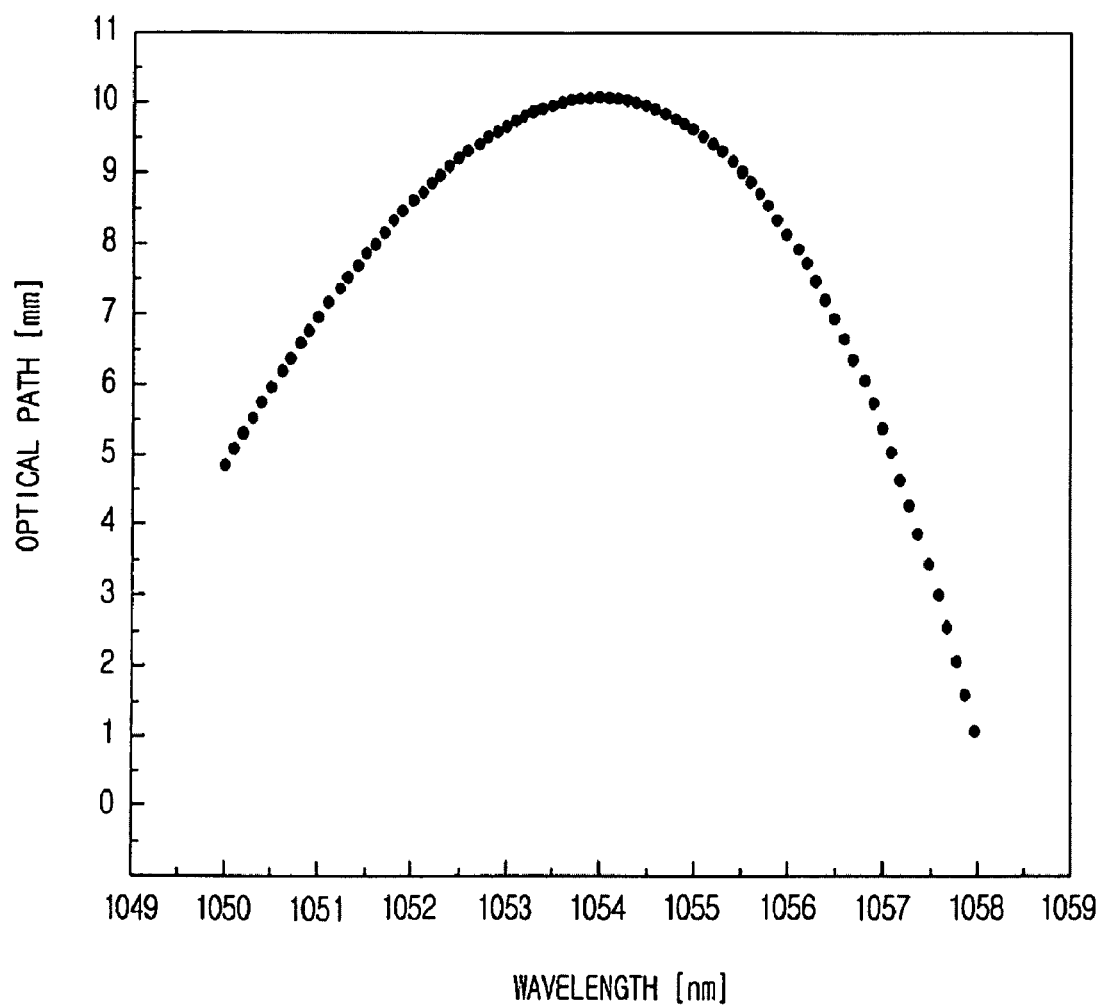
FIG. 7b is a graph showing the results of computer simulation of a signal chirping structure generated in another type of U-shaped chirped pulse generator, in which an antiparallel diffraction grating structure and a parallel diffraction grating structure are arranged in series, according to the present invention.
Figure 7C:
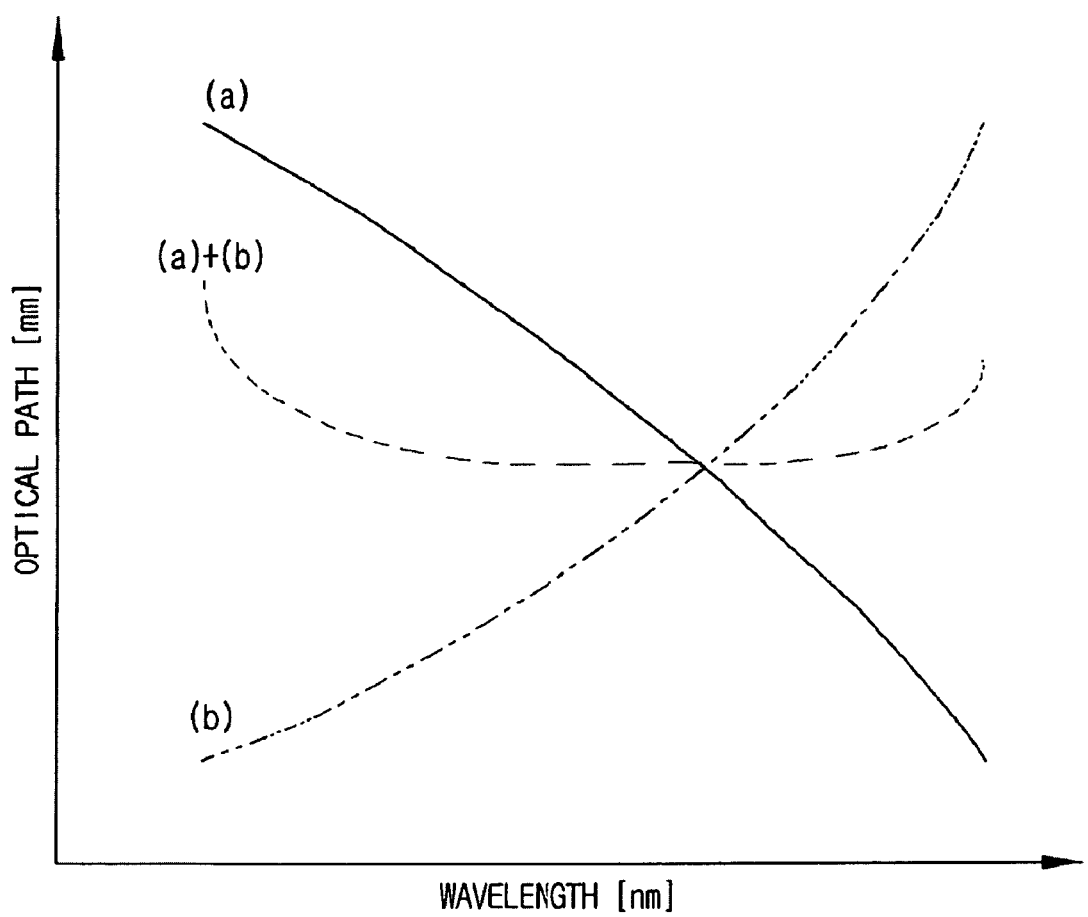

FIG. 7a is a graph showing the results of computer simulation of a signal chirping structure generated in a chirped pulse generator, in which an antiparallel diffraction grating structure and a parallel diffraction grating structure are arranged in series, according to the present invention, FIG. 7b is a graph showing the results of computer simulation of a signal chirping structure generated in a chirped pulse generator in which an antiparallel diffraction grating structure and a parallel diffraction grating structure are arranged in series according to the present invention, and FIG. 7c is a graph showing the derivation of the values indicated in the graph of FIG. 7a.

FIGS. 7a and 7b can be utilized as the optical pulse compressor and the optical pulse stretcher, respectively, or can be utilized in the reverse order.

First, in FIG. 7a, a chirped pulse generator is constructed such that an antiparallel diffraction grating structure (Offner-triplet type) and a parallel diffraction grating structure are arranged in series, the parameters for the diffracting gratings being set as follows.

That is, in the antiparallel diffraction grating structure, first-order dispersion is used, the number of grooves of the diffraction grating is set to 1740 lines/mm, the angle of incidence is set to 62.8°, the angle of diffraction is 70.8°, and a corresponding separation distance is set to 530 mm. Further, in the parallel diffraction grating structure, −1st-order diffraction is used, the number of grooves of each diffraction grating is set to 850 lines/mm, the angle of incidence is set to 5.0°, the angle of diffraction is set to 79.4°, and a corresponding separation distance is set to 692 mm.

As a result, a chirped pulse generator having a U-shaped chirping structure, in which third-order dispersion is accumulated/emphasized while second-order dispersion is canceled centered on a wavelength of 1054 nm, can be designed.

In FIG. 7b, a chirped pulse generator is constructed such that an antiparallel diffraction grating structure (Offner-triplet type) and a parallel diffraction grating structure are arranged in series, and parameters for the diffraction gratings are set as follows.

That is, in the antiparallel diffraction grating structure, −1st-order diffraction is used, the number of grooves of the diffraction grating is set to 850 lines/mm, the angle of incidence is set to 5.0°, the angle of diffraction is set to 79.4°, and a corresponding separation distance is set to 692 mm. Further, in the parallel diffraction grating structure, first-order diffraction is used, the number of grooves in each diffraction grating is set to 1740 lines/mm, the angle of incidence is set to 62.8°, the angle of diffraction is set to 70.8°, and a corresponding separation distance is set to 530 mm.

As a result, a chirped pulse generator having an inverted U-shaped chirping structure, in which third-order dispersion is accumulated/emphasized while second-order dispersion is canceled centered on a wavelength of 1054 nm, can be designed.

In an embodiment of the present invention, a portion to the left of a wavelength of 1054 nm is used for the signal, and a portion to the right of a wavelength of 1054 nm is used for the idler.

All of the two types of U-shaped chirped pulse generators (that is, U-shaped chirping and inverted U-shaped chirping) can be utilized as the optical pulse stretcher and the optical pulse compressor. The two types of U-shaped chirped pulse generators are the same in that an antiparallel diffraction grating structure and a parallel diffraction grating structure are arranged in series, but, when the two types of U-shaped chirped pulse generator are used in pulse stretcher and pulse compressor respectively, the values of the parameters for the diffraction gratings to be used in the antiparallel diffraction grating structure and the parallel diffraction grating structure of the optical pulse stretcher are respectively the same as values of the parameters for the diffraction gratings to be used in the parallel diffraction grating structure and the antiparallel diffraction grating structure of the optical pulse compressor.

Further, in the optical pulse stretcher (or optical pulse compressor), the values of the parameters for diffraction gratings to be used in the antiparallel diffraction grating structure and in the parallel diffraction grating structure differ from each other.

Next, an algorithm for deriving the U-shaped chirping structure of FIG. 7a is described with reference to FIG. 57c.

A phase function $\phi(\omega)$, obtained throughout the entire optical system, is represented using the following equation.

$$\phi(\omega) = \phi(\omega_0) + \frac{d\phi(\omega_0)}{d\omega}(\omega-\omega_0) + \frac{1}{2!}\frac{d^2\phi(\omega_0)}{d\omega^2}(\omega-\omega_0)^2 + \frac{1}{3!}\frac{d^3\phi(\omega_0)}{d\omega^3}(\omega-\omega_0)^3 + \frac{1}{4!}\frac{d^4\phi(\omega_0)}{d\omega^4}(\omega-\omega_0)^4 + \Lambda$$

$$= \sum_{n=0} \frac{1}{n!}\frac{d^n\phi(\omega_0)}{d\omega^n}(\omega-\omega_0)^n$$

Variation characteristics for the angular frequency are referred to as dispersion. In the above equation, the first term indicates an absolute phase, the coefficient of the second term indicates a group delay, the coefficient of the third term indicates Group Velocity Dispersion (GVD), the coefficient of the fourth term indicates Third-Order Dispersion (TOD), and the coefficient of the fifth term indicates Fourth-Order Dispersion (FOD).

If the phase function is differentiated by angular frequency, the following equation is obtained.

$$\frac{d\phi(\omega)}{d\omega} = \frac{d\phi(\omega_0)}{d\omega} + \frac{d^2\phi(\omega_0)}{d\omega^2}(\omega-\omega_0) +$$
$$\frac{1}{2!}\frac{d^3\phi(\omega_0)}{d\omega^3}(\omega-\omega_0)^2 + \frac{1}{3!}\frac{d^4\phi(\omega_0)}{d\omega^4}(\omega-\omega_0)^3 + \Lambda$$
$$= \sum_{n=0} \frac{1}{n!}\frac{d^{n+1}\phi(\omega_0)}{d\omega^{n+1}}(\omega-\omega_0)^n$$

The above equation indicates variation in group delay relative to angular frequency, which represents the time it takes for light having a corresponding wavelength to pass through an optical system.

In the above equation, the first term indicates the time it takes for light having a center wavelength to pass through the optical system, the second term GVD indicates a temporally linearly chirped coefficient, the third term TOD indicates a coefficient which is chirped in the form of a quadratic function (that is, a parabolic form), and the fourth term FOD indicates a coefficient which is chirped in the form of a cubic function.

The group velocity dispersion (GVD) is dispersion represented in a quadratic form in phase, and indicates the amount of chirping, by which a pulse is linearly chirped for frequency in a certain system. The conventional optical pulse stretcher or optical pulse compressor obtains a linearly chirped pulse structure due to the influence of second-order dispersion. In contrast, the present invention mainly uses third-order dispersion.

Meanwhile, when two optical systems apply group velocity dispersions having opposite signs and the same magnitude, only third-order dispersion (TOD) seems to be a factor finally influencing the chirping structure of pulses through the serial arrangement of the optical systems. In this case, the influences of second-order dispersion cancel each other. For reference, fourth-order dispersion, fifth-order dispersion, etc. exert a very slight influence on the chirping structure of pulses.

The illustration and description for this case are represented as follows.

That is, differentiations (a) and (b) for the phase functions of two certain optical systems are represented by the following equations, $C_1 + a_1*(\omega-\omega_0) + a_2(\omega-\omega_0)^2, \ldots$ (correspond to graph (a) of FIG. 7c) (a);

$C_2 + b_1*(\omega-\omega_0) + b_2(\omega-\omega_0)^2, \ldots$ (correspond to graph (b) of FIG. 7c) (b);

where $C_1$, $C_2$, $a_1$, $a_2$, $b_1$, and $b_2$ are constants.

If equation (a) is added to equation (b), the following equation is obtained.

That is, $(a)+(b)=(C_1+C_2)+(a_2+b_2)*(\omega-\omega_0)+ \ldots$ is obtained, where $a_1=-b_1$.

The above equation is approximately a quadratic function of w, and has a U-shaped chirp caused by the influence of only the third-order dispersion of the original phase function. Therefore, if the two optical systems are designed such that $a_1=-b_1$ is set, but $a_2$ and $b_2$ can be accumulated to have large values, a series arrangement of the two optical systems may function as a U-shaped chirped pulse generator.

FIG. 8 illustrates examples of the application of the design of the OPCPA apparatus designed to have a collinear phase matching configuration which can be applied to the present invention.

Figure 8A:
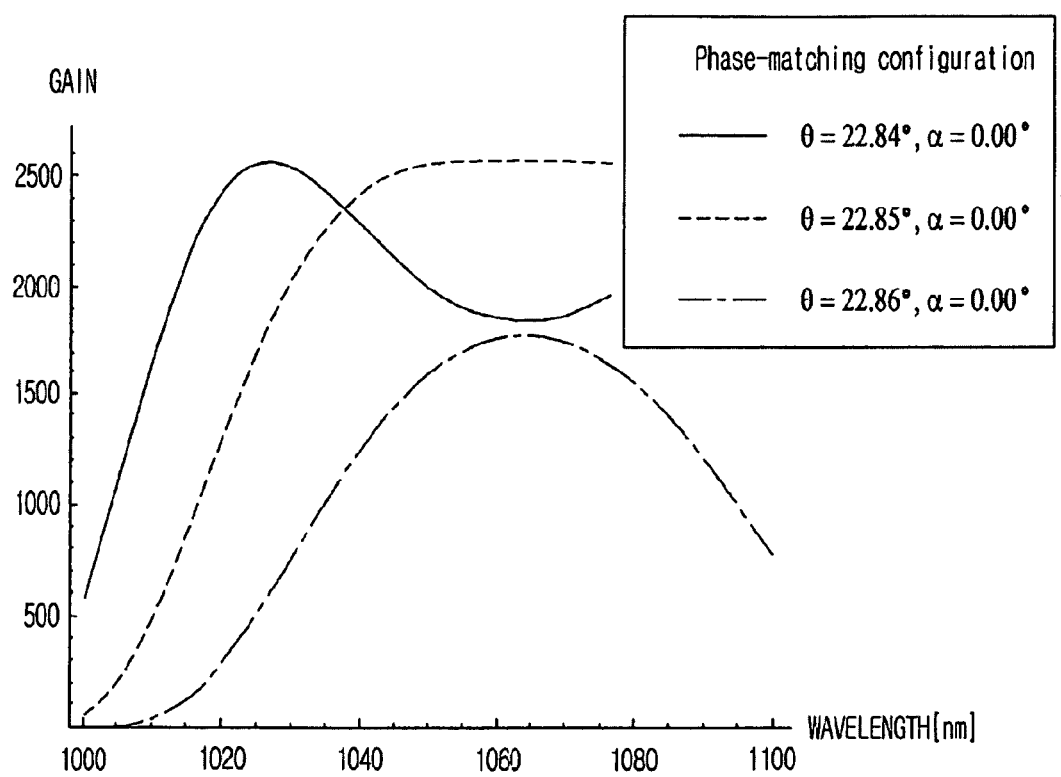
FIG. 8 illustrates examples of application of the design of the OPCPA apparatus, designed to have a collinear phase matching configuration which can be applied to the present invention.
Figure 8B:
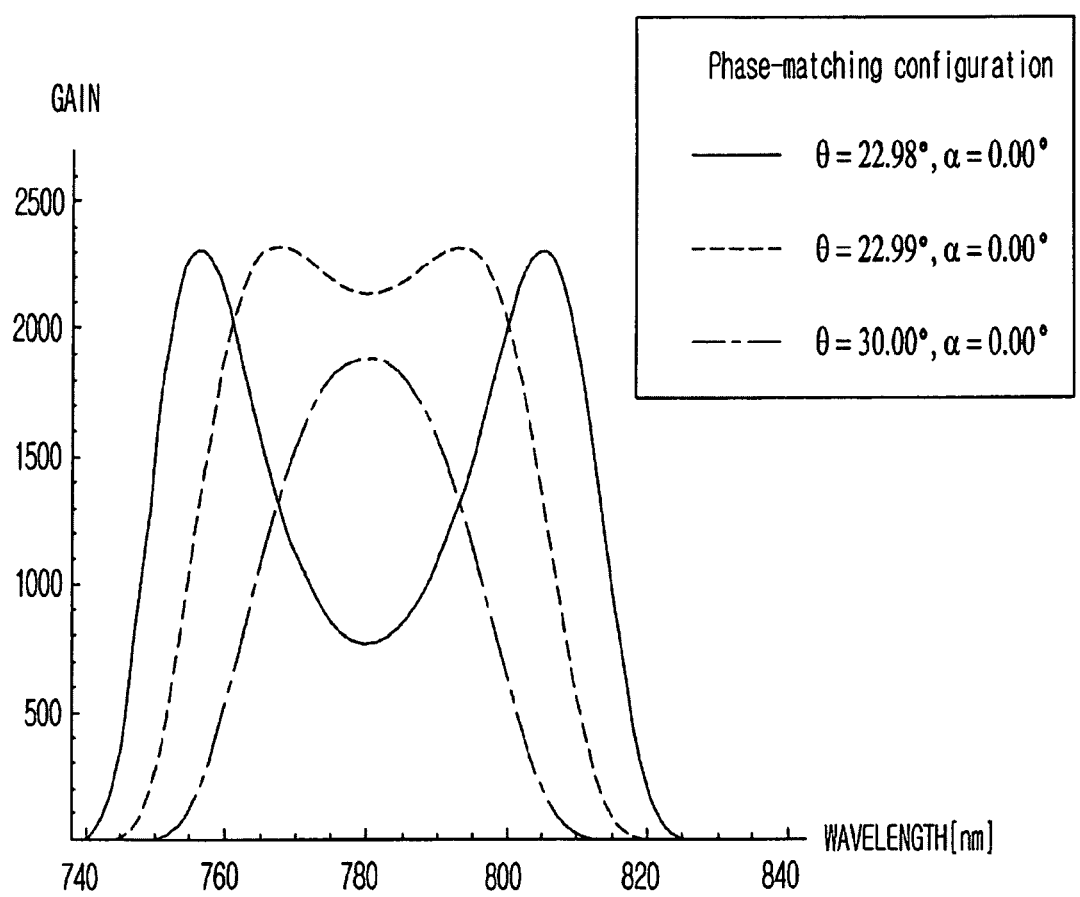

FIGS. 8a and 8b illustrate parametric gain curves of the OPA unit.

FIG. 8a is a graph obtained when the intensity of a pump is set to 400 MW/cm$^2$, the length of the BBO crystal is 15 mm, and the wavelength of the pump is 532 nm, and can be utilized for amplifying a signal having a center wavelength ranging from 1045 nm to 1085 nm. FIG. 8b is a graph obtained when the intensity of a pump is 400 MW/cm$^2$, the length of the BBO crystal is 11 mm, and the wavelength of the pump is set to 390 nm, and can be utilized for amplifying a signal having a center wavelength ranging from 770 nm to 790 nm (for the two cases, the same phase matching corresponding to type I, in which the polarizations of both a signal and an idler are ordinary waves, is used).

In detail, FIGS. 8a and 8b are optical parametric amplification gains (parametric gains). For example, the solid line of FIG. 8a indicates an amplification gain curve obtained through an amplification stage which is designed at $\theta=22.84°$ and $\alpha=0°$, and shows that a signal amplification gain of about 2500 times is obtained with respect to a signal having a wavelength of 1030 nm, and a signal amplification gain of about 1800 times is obtained with respect to a signal having a wavelength of 1050 nm.

For reference, the solid line of FIG. 8a indicates the gain curve obtained when $\theta=22.84°$ and $\alpha=0°$, the dotted line thereof indicates the gain curve obtained when $\theta=22.85°$ and $\alpha=0°$, and the one-dot chain line thereof indicates the gain curve obtained when $\theta=22.86°$ and $\alpha=0°$.

Further, the solid line of FIG. 8b indicates the gain curve obtained when $\theta=29.98°$ and $\alpha=0°$, the dotted line thereof indicates the gain curve obtained when $\theta=29.99°$ and $\alpha=0°$, and the one-dot chain line thereof indicates the gain curve obtained when $\theta=23.00°$ and $\alpha=0°$. In this case, $\theta$ denotes the angle between the optical axis of crystal and the pump, and $\alpha$ denotes the angle between the pump and the signal.

The present invention uses collinear phase matching to utilize an idler, which must satisfy the following condition (relational expression), as described above.

<Condition>

$\lambda_s \approx 2\lambda_p \approx \lambda_i$ where $\lambda_s$ is the wavelength of a signal, $\lambda_p$ is the wavelength of a pump, and $\lambda_i$ is the wavelength of an idler.

If the above condition is satisfied, the OPA gain can be obtained as a broadband gain even at the time of performing collinear phase matching.

Figure 10B:
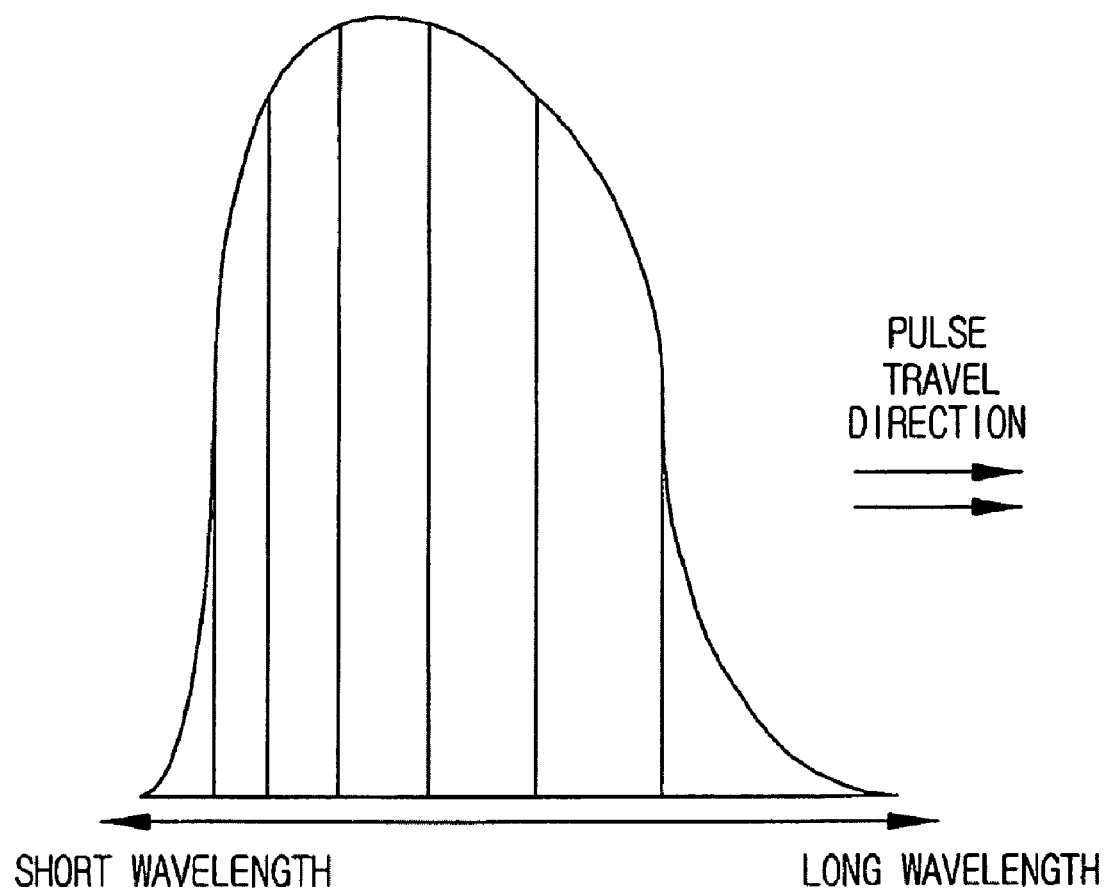

FIG. 9 is a graph showing the chirped state of an original signal, stretched by the optical pulse stretcher (using third-order dispersion) of the OPCPA apparatus according to the present invention, and FIGS. 10a and 10b are graphs respectively showing the chirped states of a signal and an idler, which are the output light of the OPA unit of the OPCPA apparatus according to the present invention.

FIG. 9 and FIG. 10 illustrate the case in which, as described above, FIG. 7b is used for the optical pulse stretcher, and a portion to the left of the center wavelength of the U-shaped chirping structure (that is, a short wavelength portion) is used for a signal, as an example.

Referring to the drawings, if a single pulse passes through the optical pulse stretcher 100, a temporally stretched signal is obtained, as shown in FIG. 9.

This signal has a chirped state that is different from that of the signal having passed through the conventional optical pulse stretcher 10. That is, in the prior art, an antiparallel diffraction grating structure is used for the optical pulse stretcher, and thus a long-wavelength preceding-type signal is output. In contrast, in the present invention, a structure in which an antiparallel diffraction grating structure and a parallel diffraction grating structure are connected in series is used for the optical pulse stretcher, and thus a short-wavelength (or long-wavelength) preceding-type signal, as shown in FIG. 9, is output. In this case, the signal has a characteristic pulse chirping structure that uses third-order dispersion.

When an optical signal having such a chirped state passes through the OPA unit 300, the amplified signal (refer to FIG. 10a) and the idler (refer to FIG. 10b) are generated.

The idler has a chirped state in which a long wavelength precedes a short wavelength.

As described above, the present invention is implemented such that the pump of the output light of the OPA unit 300 is separated and removed, and the idler and the amplified signal of the output light are selected and transmitted to a subsequent stage (optical pulse compressor).

Thereafter, both the signal and the idler are temporally compressed together by the optical pulse compressor. As a result, an energy amplification factor and a wavelength bandwidth are doubled, thus not only compensating for spectrum loss, but also obtaining laser light having a temporal pulse width shorter than that of the original signal.

The operation and effects of the OPCPA apparatus of the present invention having the above construction are described below.

Laser light, having passed through the optical pulse stretcher 100 having the construction of FIG. 6b or 6c, has a chirped state that is temporally stretched according to wavelength, with second-order dispersion (GVD) being eliminated.

When a portion to the left of the center wavelength (that is, a short wavelength portion) of the U-shaped chirping structure is used for a signal in the optical pulse stretcher 100, the waveform of FIG. 9 is output.

The output light (signal) of the optical pulse stretcher 100 is incident on the pump-injection dichroic mirror 800 through the beam path changing mirrors 720 to 740, and light (pump) output from the pump laser 200 is also incident on the pump-injection dichroic mirror 800.

Both the signal and pump are simultaneously incident on the OPA unit 300. In the OPA unit, as the signal is amplified using the pump, an idler is generated, and the pump itself is attenuated.

Consequently, the output light of the OPA unit includes the attenuated pump, the amplified signal, and the idler. In this case, the signal and the idler have almost the same intensity.

In the present invention, if necessary, an acousto-optic filer or a chirp mirror is provided on an optical path formed upstream of the OPA unit, so that even-order dispersion (in particular, residual fourth-order dispersion) is eliminated. As a result, only odd-order dispersion, including third-order dispersion (TOD) remains.

The output light of the OPA unit is incident on the pump-removal dichroic mirror 400, and is separated into an idler, a signal, and remaining light (pump). That is, the pump passes through the pump-removal dichroic mirror 400 and is removed by the beam dumper 500, and both the signal and the idler are reflected from the pump-removal dichroic mirror 400.

Both the signal and idler are incident on the optical pulse compressor 600, and the optical pulse compressor 600 compensates for pulse chirping caused by U-shaped third-order dispersion that is imparted by the optical pulse stretcher, and thus temporally compresses the signal and the idler.

If, in the above construction, laser light, having passed through the optical pulse compressor, is not amplified to the intensity desired by a user (a predetermined intensity or more), the present invention allows the laser light to repeatedly pass through the amplification process from the optical pulse stretcher to the optical pulse compressor. In this case, although a method of compressing the light (signal and idler) using the optical pulse compressor and subsequently stretching the light using the optical pulse stretcher can be used, the optical pulse compressor and the optical pulse stretcher may be integrated into a single element by suitably changing the parameters of corresponding diffraction gratings using the fact that the optical pulse stretcher and the optical pulse compressor have the same structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The OPCPA apparatus of the present invention is advantageous in that both an optical pulse stretcher and an optical pulse compressor, each having a series arrangement of an antiparallel diffraction grating structure and a parallel diffraction grating structure, are constructed, so that third-order dispersion, which is odd-order dispersion, is emphasized while group velocity dispersion is eliminated, and so that a signal and an idler, having almost the same intensity, are simultaneously incident together on the optical pulse compressor, thus doubling a wavelength bandwidth as well as an energy amplification factor.

Accordingly, the present invention can not only compensate for spectrum loss, but also obtain laser light having a temporal pulse width shorter than that of an original signal.

Further, the construction of the present invention can double the spectrum of a signal up to about 40 to 80 nm with respect to an ultrashort light source (optical fiber-laser source or the like) (having a wavelength ranging from 1020 to 1060 nm) in a near infrared region using ytterbium (Yb), etc., through the use of the above method. In particular, such a construction obtains a bandwidth having little difference with respect to a Ti: sapphire ultrashort laser source, which has recently been used in most fields, and can be immediately utilized for increasing the wavelength bandwidth of Nd-series and Yb-series ultrashort laser sources existing in a wavelength band ranging from 1000 to 1100 nm in an OPCPA apparatus that uses a 532 nm neodymium-doped Yttrium aluminum garnet (Nd: YAG) doubled pump.

The invention claimed is:

1. An Optical Parametric Chirped Pulse Amplification (OPCPA) apparatus, comprising:
   an optical pulse stretcher for outputting chirped laser light using odd-order dispersion;
   a pump laser for outputting pump laser light;
   an optical parametric amplification unit for receiving the pump laser light and the chirped laser light (signal), amplifying the signal using the pump laser light, and generating an idler;
   an optical signal separation unit for separating output light of the optical parametric amplification unit into the signal, the idler and remaining light (pump); and an optical pulse compressor for compensating for pulse chirping caused by the odd-order dispersion that is imparted by the optical pulse stretcher, thus temporally compressing together the signal and the idler, which overlap each other, wherein the following relational expression is satisfied upon performing collinear phase matching, <relational expression>

$$\lambda_s \approx 2\lambda_p \approx \lambda_i$$

where $\lambda_s$ is a wavelength of the signal, $\lambda_p$ is a wavelength of the pump, and $\lambda_i$ is a wavelength of the idler.

2. The OPCPA apparatus according to claim 1, wherein the optical pulse stretcher and the optical pulse compressor are designed to cancel second-order dispersion (group velocity dispersion) and to maximize third-order dispersion.

3. The OPCPA apparatus according to claim 1, wherein each of the optical pulse stretcher and the optical pulse compressor is implemented to use a half of a U-shaped chirping structure, which uses third-order dispersion, for the signal and to use a remaining half thereof for the idler.

4. The OPCPA apparatus according to claim 1, wherein the optical pulse stretcher applies chirping allowing a center wavelength to follow a surrounding wavelength and allowing the surrounding wavelength to precede the center wavelength.

5. The OPCPA apparatus according to claim 1, wherein the optical pulse stretcher applies chirping allowing a center wavelength to precede a surrounding wavelength and allowing the surrounding wavelength to follow the center wavelength.

6. The OPCPA apparatus according to claim 1, further comprising means for eliminating residual even-order dispersion.

7. The OPCPA apparatus according to claim 6, wherein the even-order dispersion elimination means is one of an acousto-optic filter and a chirp mirror.

8. The OPCPA apparatus according to claim 6, wherein the even-order dispersion elimination means is placed on an optical path located upstream of the optical parametric amplification (OPA) unit.

9. The OPCPA apparatus according to claim 1, wherein the optical pulse stretcher is implemented such that an antiparallel diffraction grating structure and a parallel diffraction grating structure are arranged in series, thus eliminating second-order dispersion (group velocity dispersion) when pulse chirping is performed.

10. The OPCPA apparatus according to claim 1, wherein the optical pulse compressor is implemented such that an antiparallel diffraction grating structure and a parallel diffraction grating structure are arranged in series.

11. The OPCPA apparatus according to claim 9, wherein values of parameters for diffraction gratings to be used in the antiparallel diffraction grating structure and the parallel diffraction grating structure are differently applied.

12. The OPCPA apparatus according to claim 10, wherein values of parameters for diffraction gratings to be used in the antiparallel diffraction grating structure and the parallel diffraction grating structure are differently applied.

13. The OPCPA apparatus according to claim 11, wherein the optical pulse stretcher and the optical pulse compressor are designed such that the values of the parameters for the diffraction gratings to be used in the antiparallel diffraction grating structure and the parallel diffraction grating structure of the optical pulse stretcher are respectively the same as the values of the parameters for the diffraction gratings to be used in the parallel diffraction grating structure and the antiparallel diffraction grating structure of the optical pulse compressor.

14. The OPCPA apparatus according to claim 9, wherein the parallel diffraction grating structure comprises two diffraction gratings having a parallel arrangement, and a single roof mirror for reflecting incident light at a changed height.

15. The OPCPA apparatus according to claim 10, wherein the parallel diffraction grating structure comprises two diffraction gratings having a parallel arrangement, and a single roof mirror for reflecting incident light at a changed height.

16. The OPCPA apparatus according to claim 1, wherein the optical parametric amplification unit is implemented using a nonlinear optical medium.

17. The OPCPA apparatus according to claim 16, wherein the nonlinear optical medium is one of Beta Barium Borate (BBO), Lithium Triborate (LBO), Potassium Titanyl Phosphate (KTP), and Potassium Dihydrogen Phosphate (KDP).

18. The OPCPA apparatus according to claim 1, wherein the optical signal separation unit is a pump-removal dichroic mirror for reflecting the idler and the amplified signal, output from the optical parametric amplification unit, and passing remaining light (pump) therethrough, thus separating the output light of the optical parametric amplification unit into the idler, the amplified signal, and the remaining light.

19. The OPCPA apparatus according to claim 1, further comprising a beam dumper for removing the pump separated by the optical signal separation unit.

20. The OPCPA apparatus according to claim 1, further comprising a mirror (pump-injection dichroic mirror) for receiving output light of both the optical pulse stretcher and the pump laser and transmitting the output light to the optical parametric amplification unit.

21. The OPCPA apparatus according to claim 1, further comprising a beam path changing mirror placed downstream of the optical pulse stretcher and adapted to change a path of incident light toward a pump-injection dichroic mirror.

22. The OPCPA apparatus according to claim 1, further comprising a beam path changing mirror for changing paths of the signal and idler, separated by the optical signal separation unit, toward the optical pulse compressor.

23. An Optical Parametric Chirped Pulse Amplification (OPCPA) apparatus, comprising:
    an optical pulse stretcher for outputting chirped laser light using odd-order dispersion;
    a pump laser for outputting pump laser light;
    an optical parametric amplification unit for receiving the pump laser light and the chirped laser light (signal), amplifying the signal using the pump laser light, and generating an idler;
    an optical signal separation unit for separating output light of the optical parametric amplification unit into the signal, the idler, and remaining light (pump); and
    an optical pulse compressor for compensating for pulse chirping caused by the odd-order dispersion that is imparted by the optical pulse stretcher, thus temporally compressing together the signal and the idler, which overlap each other, wherein the optical pulse stretcher and the optical pulse compressor are designed to cancel second-order dispersion (group velocity dispersion) and to maximize third-order dispersion, and wherein the following relational expression is satisfied under collinear phase matching, <relational expression>

$$\lambda_s \approx 2\lambda_p \approx \lambda_i$$

where $\lambda_s$ is a wavelength of the signal, $\lambda_p$ is a wavelength of the pump, and $\lambda_i$ is a wavelength of the idler.

24. An Optical Parametric Chirped Pulse Amplification (OPCPA) apparatus, comprising:

an optical pulse stretcher for outputting chirped laser light using odd-order dispersion;

a pump laser for outputting pump laser light;

an optical parametric amplification unit for receiving the pump laser light and the chirped laser (signal), amplifying the signal using the pump laser light, and generating an idler;

an optical signal separation unit for separating output light of the optical parametric amplification unit into the signal, the idler and remaining light (pump); and an optical pulse compressor for compensating for pulse chirping caused by the odd-number dispersion that is imparted by the optical pulse stretcher, thus temporally compressing together the signal and the idler, which overlap each other, wherein the optical pulse stretcher and the optical pulse compressor are designed to use a half of a U-shaped chirping structure, which uses the third-order dispersion, for the signal and to use a remaining half thereof for the idler, and wherein the following relational expression is satisfied under collinear phase matching, <relational expression>

$$\lambda_s \approx 2\lambda_p \approx \lambda_i$$

where $\lambda_s$ is a wavelength of the signal, $\lambda_p$ is a wavelength of the pump, and $\lambda_i$ is a wavelength of the idler.

* * * * *